(12) United States Patent
Bahrami et al.

(10) Patent No.: US 11,200,033 B2
(45) Date of Patent: Dec. 14, 2021

(54) APPLICATION PROGRAMMING INTERFACE (API) BASED OBJECT ORIENTED SOFTWARE DEVELOPMENT AND TEXTUAL ANALYSIS

(71) Applicant: FUJITSU LIMITED, Kawasaki (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/741,700

(22) Filed: Jan. 13, 2020

(65) Prior Publication Data
US 2021/0216288 A1    Jul. 15, 2021

(51) Int. Cl.
*G06F 8/36* (2018.01)
*G06F 16/955* (2019.01)
*G06F 8/20* (2018.01)
*G06F 9/54* (2006.01)
*G06F 11/36* (2006.01)

(52) U.S. Cl.
CPC ............... *G06F 8/36* (2013.01); *G06F 8/24* (2013.01); *G06F 9/54* (2013.01); *G06F 11/3688* (2013.01); *G06F 16/955* (2019.01)

(58) Field of Classification Search
CPC . G06F 8/36; G06F 8/24; G06F 16/955; G06F 9/54; G06F 11/3688
USPC .................................................. 717/107–121
See application file for complete search history.

(56) References Cited

U.S. PATENT DOCUMENTS

| | | | | |
|---|---|---|---|---|
| 5,331,556 | A | * | 7/1994 | Black, Jr. .............. G06F 40/253 704/9 |
| 5,799,268 | A | * | 8/1998 | Boguraev ............. G06F 40/289 704/9 |
| 6,026,388 | A | * | 2/2000 | Liddy ................. G06F 16/3329 |
| 6,076,088 | A | * | 6/2000 | Paik ....................... G06F 16/367 |
| 6,081,774 | A | * | 6/2000 | de Hita ............... G06F 16/3338 704/9 |
| 6,094,679 | A | * | 7/2000 | Teng ......................... G06F 8/61 709/217 |

(Continued)

OTHER PUBLICATIONS

Larsen et al, "Slicing Object-Oriented Software", IEEE, pp. 495-505 (Year: 1996).*

(Continued)

*Primary Examiner* — Anil Khatri
(74) *Attorney, Agent, or Firm* — Fujitsu Patent Center

(57) ABSTRACT

According to an aspect of an embodiment, operations include creating object-oriented software platform by performing a textual analysis of a documentation corpus associated with a set of APIs. The operations further include generating a set of API call objects for an API endpoint of a first API of the set of APIs and constructing a set of natural language descriptors corresponding to the set of API call objects based on the textual analysis. The operations further include generating a set of business objects. Each business object encapsulates conditions applicable on a set of input/output parameters associated with a corresponding API call object of the set of API call objects. The operations further include constructing a software package that encapsulates the set of API call objects, the set of natural language descriptors, and the set of business objects.

17 Claims, 13 Drawing Sheets

(56) References Cited

U.S. PATENT DOCUMENTS

| | | | | |
|---|---|---|---|---|
| 6,321,372 | B1* | 11/2001 | Poirier | G06F 8/30 717/122 |
| 7,346,490 | B2* | 3/2008 | Fass | G06F 40/268 704/7 |
| 7,805,704 | B2* | 9/2010 | Galanes | G06F 8/38 717/107 |
| 8,516,442 | B2* | 8/2013 | Grechanik | G06F 8/36 717/122 |
| 8,630,975 | B1* | 1/2014 | Guo | G06F 16/24578 707/608 |
| 8,661,406 | B2* | 2/2014 | Shapiro | G06F 8/30 717/106 |
| 8,782,603 | B2* | 7/2014 | Plate | H04L 63/1433 717/121 |
| 8,893,084 | B2* | 11/2014 | Parker | G06F 9/451 717/121 |
| 9,015,730 | B1* | 4/2015 | Allen | G06F 9/541 719/313 |
| 9,811,395 | B1 | 11/2017 | Greenwood et al. | |
| 10,007,532 | B1 | 6/2018 | Franco et al. | |
| 2017/0102925 | A1 | 4/2017 | Ali et al. | |

OTHER PUBLICATIONS

Nierstrasz et al, "Component-Oriented Software Development", ACM, pp. 160-165 (Year: 1992).*

Antoniol et al, "Tracing Object-Oriented Code into Functional Requirements", IEEE, pp. 1-8 (Year: 2000).*

Palomba, "Textual Analysis for Code Smell Detection", IEEE, pp. 769-771 (Year: 2015).*

Eichelberger et al, "A Systematic Analysis of Textual Variability Modeling Languages", ACM, pp. 12-21 (Year: 2013).*

Aarts et al., "A Practical Application for Sentiment Analysis on Social Media Textual Data", ACM, pp. 1-6 (Year: 2020).*

Extended European Search Report (EESR) dated Mar. 4, 2021, by the European Patent Office in counterpart application EP20195964.0, 8 pages.

* cited by examiner

```
{
  info: {...},
  paths: {
    + /people/{userId}/people/{collection}: {...},
    + /people/{userId}: {...},
    + /activities/{activityId}/comments: {...},
    + /activities: {...},
    + /activities/{activityId}: {...},
    + /people: {...},
    + /comments/{commentId}: {...},
    + /people/{userId}/activities/{collection}: {...},
    + /activities/{activityId}/people/{collection}: {...}
  },
  schemes: [
    "https"
  ],
  parameters: {
    - prettyPrint: {
      default: true,
      type: "boolean",
      description: "Returns response with indentations and line breaks.",
      name: "prettyPrint",
      in: "query"
    },
    - fields: {
      type: "string",
      description: "Selector specifying which fields to include in a partial response.",
      name: "fields",
      in: "query"
    },
  }
}
```

FIG. 7

APPLICATION PROGRAMMING INTERFACE (API) BASED OBJECT ORIENTED SOFTWARE DEVELOPMENT AND TEXTUAL ANALYSIS

FIELD

The embodiments discussed in the present disclosure are related to application programming interface (API)-based software development platform.

BACKGROUND

Many companies and organizations offer an application programming interfaces (API) infrastructure that offers APIs for several applications, such as speech processing and social media analysis, to third party developers and/or third party organizations. Typically, APIs are programmatic interfaces with publicly exposed endpoints, which specify where resources can be accessed by a third party software. The details regarding usage of these APIs and associated example codes are usually provided in API documentations.

With proliferation of APIs for provision of various functionalities for software applications, developers and organizations in the software industry can leverage the functionalities of pre-existing APIs to rapidly develop software applications. However, the development of a software application by use of the pre-existing APIs can be a time-consuming task, especially when developers have to select and test out relevant API(s) from an ever-growing number of APIs. Additionally, many users, who want to develop software applications but have limited or no skills in software programming, have no other option but to rely on skilled developers to build software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include creating an object-oriented software platform as an API-based software development platform for application developers or administrators. Herein, the object-oriented software platform may also be referred to as multi-level granularity software platform for developers. The operations of creating the object-oriented software platform may include performing a textual analysis of a documentation corpus associated with a set of APIs and generating a set of API call objects for an API endpoint of a first API of the set of APIs. The operations may further include constructing a set of natural language descriptors corresponding to the generated set of API call objects based on the textual analysis and generating a set of business objects. Each business object of the set of business objects may encapsulate conditions applicable on a set of input/output parameters associated with a corresponding API call object of the generated set of API call objects. The operations may further include constructing a software package that may encapsulate the generated set of API call objects, the constructed set of natural language descriptors, and the generated set of business objects.

According to an aspect of another embodiment, a system for API-based software development is provided. The system may render an electronic user interface (UI) of an object-oriented multi-level granularity software platform on a display device. The rendered electronic UI may include a set of user-selectable objects that may correspond to a set of software packages included in the object-oriented software platform. The system may select a software package from the set of software packages based on a first input over a first user-selectable object of the set of user-selectable objects and may update, based on a second input, values of conditions on a set of input/output parameters for a set of API call objects included in the selected software package. After the update, the system may further select at least one natural language descriptor of a set of natural language descriptors corresponding to the set of API call objects based on a third input and select at least one API call object of the set of API call objects based on a fourth input. The system may compile a software component and construct an API-based software application based on the compiled software component. The software component may be compiled based on the selected at least one API call object, the updated values of the conditions, and the selected software package.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 7 is an example of a portion of a unified specification of a set of APIs;

DESCRIPTION OF EMBODIMENTS

Figure 1:
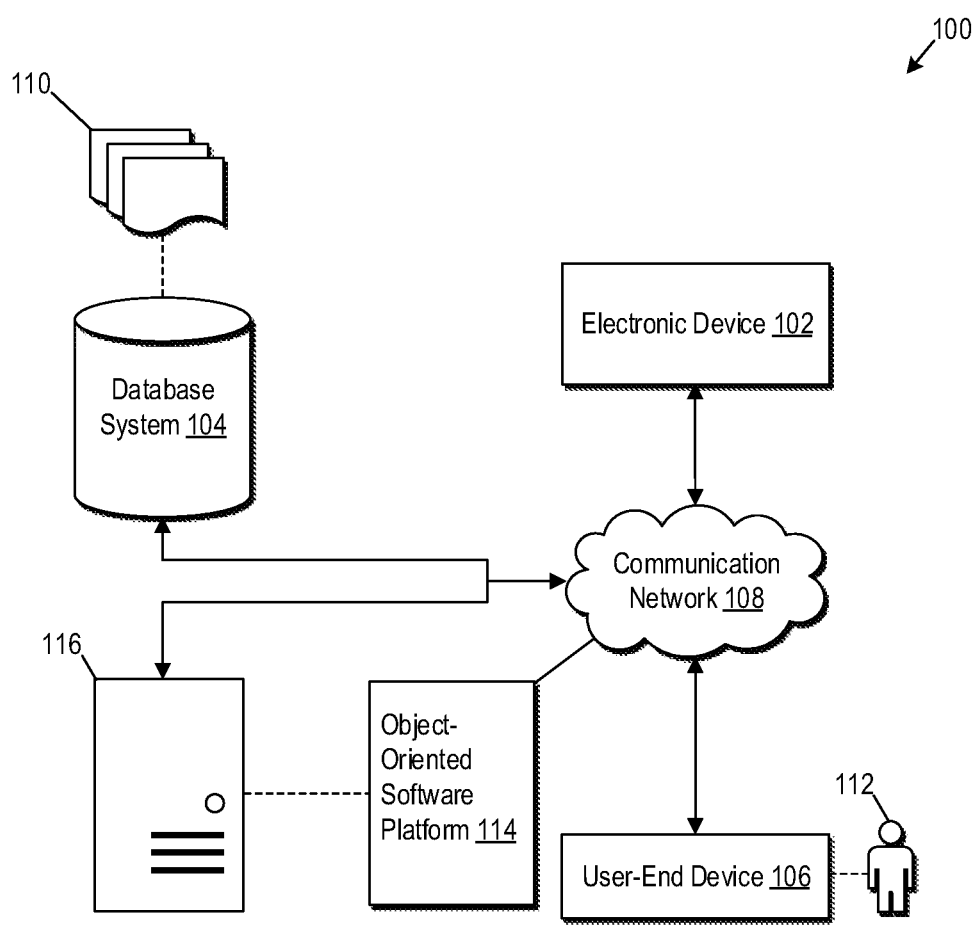
FIG. 1 is a diagram that illustrates an example environment related to creation of an object-oriented software platform.

Embodiments described in the present disclosure relate to creation of an object-oriented software platform and use of the created object-oriented software platform for API-based development of software applications. Typically, development of software applications based on APIs require a developer to manually analyze API documentations associated with the APIs to understand various aspects of the APIs, such as, endpoints, parameters, and responses of each of the API. Based on analysis of such documentations, the developer may be required to write a program code in a certain programming language to invoke API calls to various endpoints associated with a particular API and to embed functionalities of the API in a software application or a software component of the software application. The developer may also need to test out many APIs and select the one which satisfies requirements for the software application. In selecting and testing out the APIs, more developer time may be consumed depending on a complexity, a scale, and a set of functionalities associated with the software application under development. Also, other users who may want to develop software applications but have limited or no skills in software programming may often find these issues as prohibitive to develop software application on their own.

According to one or more embodiments of the present disclosure, the technological field of software development may be improved by configuring a computing system to create an object-oriented multi-level granularity software platform for API-based software application development. The object-oriented software platform may follow a multi-layer object-oriented architecture and may be created by analyzing API documentations to produce API connectors in an initial layer and for each unique input/output of API connector, generating micro-services in second layer. The object-oriented software platform may be created further by producing a software/hardware component (e.g. Software Development Kit, i.e., SDK) in third layer to apply business oriented policy and legacy on defined objects of a previous layer and finally, producing, in fourth layer, a software/hardware package (e.g., mobile app, software application, web application, hardware-based application. Business layer applies restrictions, limitations and system capabilities for a specific task.

According to one or more embodiments of the present disclosure, the object-oriented multi-level granularity software platform for software application development may be created automatically by mining documentations of variety of APIs. Therefore, creation of the object-oriented software platform may be fully dynamic with limited human supervision. Once the object-oriented software platform is created based on available API-based resources, then the object-oriented software platform may be deployed to allow users (developers/organizations/admins) to deal with a variety of micro-service API calls to achieve various objectives (e.g., designing simple software applications). The object-oriented software platform may allow a user to simply drag-and-drop objects to design a logic flow of a process. Each layer may encapsulate details/information to allow the user to simply interact with the object-oriented software platform. For instance, a user may design software component layer without seeing details at an initial stage; then the user may double click on each object to add more detail of the process which contains design objects.

Once the object-oriented software platform is defined (added all concepts relevant to each layer), then user may pick objects in each layer. However, by selecting an object from higher-layer then it will be limited option of available resources/concepts in lower layers. For example, a user may select notification in business layer, then in design layer has only available resources (e.g., email notification, phone call notification and text message-SMS notification). The object-oriented software platform may allow an administrator or a developer to produce API calls in a lower-layer of the object-oriented software platform, create a micro-service from API call, limit micro-services and obtain a final software package in higher layer of the object-oriented software platform. The object-oriented software platform may use concept mining to extract and define description/concept for each object in each layer and can be used for producing software/hardware applications. The object-oriented software platform may help different businesses to design own applications and/or customize software/hardware applications. These software/hardware applications may be designed easily with considering business oriented approaches such as limitation, legacy, policy, and the like.

A developer may use the generated electronic UI to perform API-based development of a software application. The object-oriented software platform may provide an electronic user interface (UI) to enable the developer to select a software package from a set of user-selectable tools displayed on the electronic UI and configure properties of the software package. Further, the electronic UI may enable the developer to select and configure business objects associated with the selected software package and may provide the user with options to configure individual API call objects associated with specific APIs. Finally, the electronic UI may allow the developer to request compilation of a software component based on the sequence of user-selections and user-inputs via the electronic UI. The object-oriented software platform may also generate a software application based on the compiled software component. Thus, the software application may be generated to include functionality of a relevant API with minimal coding effort from the developer in a short span of time.

Conventionally. UIs for developers typically include a code editor window and a console to view compilation logs, error logs, executed code, and outputs for code executions. All the windows (i.e., editor windows) include a granularity level that refers to the detail information. For instance, in idea layer, user may define a generic definition but in business layer, use decide which provider can be used for each object in upper layer (idea layer); therefore, the UI can be different in each layer. These UIs were developed keeping focus on users who had certain expertise in software application development and who follow typical methodology of manually coding most of the software application. Therefore, these conventional UIs lacked to provide suitable information and suitable user-selectable options that could help an ordinary user or even a developer (skilled programmer) to develop a software application, without writing much of the software code for the software application.

In contrast, the present disclosure provides an electronic UI which provides suitable information and suitable user-selectable options to improve a user's (developer/non-developer) ability to create a software application. By interacting with the electronic UI, the user may be allowed to create micro-services (API call objects) from APIs and add conditions over parameters of the micro-services to be included in the software application. Thus, the electronic UI may be an improved UI which delimits the type of information to be displayed and how the information is displayed. This may remove a need for users to manually code every aspect of the software application and as a result, save some time.

Embodiments of the present disclosure are explained with reference to the accompanying drawings.

FIG. 1 is a diagram that illustrates an example environment related to creation of an object-oriented software platform, arranged in accordance with at least one embodiment described in the present disclosure. With reference to FIG. 1, there is shown an environment 100. The environment 100 may include an electronic device 102, a database system 104, a user-end device 106, and a communication network 108. In FIG. 1, there is further shown a set of documents (hereinafter, referred to as a documentation corpus 110) associated with a set of APIs and stored in the database system 104. There is further shown a user 112 who may be associated with the electronic device 102 and/or the user-end device 106. Herein, the user 112 may be an individual, a team of individuals, or an organization associated with software development, debugging, or software testing functions.

The electronic device 102 may include suitable logic, circuitry, and interfaces that may be configured to perform operations related to creation of an object-oriented software platform 114 as a multi-level granularity software development platform to be used by different users for software application development. Examples of the electronic device 102 may include, but are not limited to, an integrated development environment (IDE) device, a software testing device, a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. Examples of the user-end terminal device may include, but are not limited to, a mobile device, a desktop computer, a laptop, and a computer work-station. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

At first, the electronic device 102 may to need to extract the documentation corpus 110 associated with a set of APIs. This documentation corpus may be available as publicly available information and/or may be part of an API repository. The documentation corpus 110 may include a plurality of structured or unstructured API specification documents associated with the set of APIs. Each API specification document may include information mapped to fields, such as API title, endpoint name(s), endpoint description(s), input/output parameters, primary categories, secondary categories, and tags associated with a corresponding API of the set of APIs.

By way of example, and not limitation, the electronic device 102 may deploy a web crawler or a web scraper (e.g. a crawler bot or a scraper bot) on one or more computer-based sources on the web so as to look up for and collect the publicly available information associated with the set of APIs. Alternatively, the electronic device 102 may extract the documentation corpus 110 from the database system 104. The database system 104 may include suitable logic, interfaces, and/or code that may be configured to store the documentation corpus 110 associated with the set of APIs. In some cases, the database system 104 may be implemented as a server, such as a cloud server, from where the documentation corpus 110 may be cached and stored on the electronic device 102. Additionally, or alternatively, the database system 104 may be implemented using hardware, including but not limited to, a processor, a microprocessor (e.g., to perform or control performance of one or more database operations), a field-programmable gate array (FPGA), or an application-specific integrated circuit (ASIC).

In order to create the object-oriented software platform 114, the electronic device 102 may perform a textual analysis of the documentation corpus 110 associated with the set of APIs. Based on the textual analysis of the documentation corpus 110, the electronic device 102 may generate a unified specification (for example, an OpenAPI (OAS) specification) for the set of APIs. An example of the generated unified specification is provided in FIG. 7. Further, the electronic device 102 may generate a set of API call objects for an API endpoint of a first API of the set of APIs. Each API call object may include program code to invoke an API call for the API endpoint and may be generated based on unique values for a set of input/output parameters of the API endpoint. Herein, an API call may correspond to a function call to a predefined API endpoint (i.e., a Uniform Resource Locator (URL) of a server that offers a service associated with the API). The API call may be performed through an API connector that may represent a single API endpoint and provides create, read, update, delete methods (such as, GET and PUT for RESTful APIs) to access and manipulate the API resources at the API endpoint. By generating multiple API call objects for a single API endpoint, a defined job of the API endpoint may be divided into micro-jobs. These micro-jobs may be referred to as API-micro services and may have mutually disparate functions. For example, an API call object may be defined by table 1, as follows:

TABLE 1

Structure of API call object

| | |
|---|---|
| Output | Function(input) |
| Function | API Call |
| Input | Input variable parameters |
| Output | Output of API call |

With reference to Table 1, for any particular API endpoint that is associated with variable parameters $P_1$ and $P_2$, many API call objects may be generated by setting unique parameter values for $P_1$ and $P_2$.

For each API call object, a concept or a natural language descriptor may need to be mined. For example, for every API call object representing a unique API call scenario, parameter description and response parameter description, API title and API description may be used to derive a concept/natural language descriptor. Such concepts/natural language descriptors may meaningfully describe the purpose of associated API call objects. Therefore, the electronic device 102 may construct a set of natural language descriptors that may correspond to the generated set of API call objects based on the textual analysis. Each natural language descriptor may be indicative of a use of a respective API call object and may include a natural language description and a topic associated with the respective API call object.

By way of example, and not limitation, example, "scanner/new_scan" is an API endpoint for a Scanner API. The new_scan endpoint takes a parameter "page" which can have many values, such as "unlimited" or "single". Each unique parameter value may be used to create a unique API call scenario/API call object and therefore, may need a unique concept/natural language descriptor. Therefore, when "scanner/new_scan (page=unlimited)" corresponds to an API call object, then the natural language descriptor may include the definition as "Get unlimited pages from scanner". Similarly, when "scanner/new_scan(page=single)" corresponds to another API call object, then then the natural language descriptor may include the definition as "Get scan of one page from scanner".

The electronic device 102 may generate a set of business objects, each of which may encapsulate conditions applicable on the set of input/output parameters associated with a corresponding API call object of the generated set of API call objects. The electronic device 102 may then construct a software package that may encapsulate the generated set of API call objects, the constructed set of natural language descriptors, and the generated set of business objects. Further, the electronic device 102 may generate an electronic user interface (UI) that may include a set of UI elements as user-selectable tools linked to the constructed software package.

Once created, the object-oriented software platform 114 may be deployed, for example, as a web-application on an application server 116. In at least one embodiment, the object-oriented software platform 114 may be deployed on the electronic device 102 and in that case, the application server 116 may incorporate the entire functionality of the application server 116. Alternatively, one or more components (e.g., as an Interactive Development Environment (IDE)) of the object-oriented software platform 114 may be provided as an installation file, while remaining components of the object-oriented software platform 114 may be deployed at the back-end of the application server 116. Once deployed, users (such as the user 112) may have options to access the electronic UI of the object-oriented software platform 114 on the user-end device 106. Once accessed, such users may be able to design and develop software development kits, software packages, or a complete software application based on interactions with the user-selectable tools that appear on the electronic UI. These user-selectable tools may allow the users to customize the development of the software application by specifying business logic, rules, and policies, and selecting which functionalities and associated API call objects to incorporate in the software application.

By way of example, the user-end device 106 may include one or more of an integrated development environment (IDE), a code editor, a software debugger, software development kit, or a testing application for each layer of development. Examples of the user-end device 106 may include, but are not limited to, a mobile device, a desktop computer, a laptop, a computer work-station, a computing device, a mainframe machine, a server, such as a cloud server, and a group of servers. Although in FIG. 1, the user-end device 106 is shown to be separated from the electronic device 102; however, in some embodiments, the user-end device 106 may be integrated with electronic device 102, without a deviation from the scope of the disclosure.

The electronic device 102, the database system 104, and the user-end device 106 may be communicatively coupled to each other, via the communication network 108. The communication network 108 may include a communication medium through which the electronic device 102 may communicate with the database system 104, the user-end device 106, and the application server 116. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1, without departing from the scope of the present disclosure. For example, the environment 100 may include more or fewer elements than those illustrated and described in the present disclosure. For instance, in some embodiments, the environment 100 may include the electronic device 102 but not the database system 104 and the user-end device 106. In addition, in some embodiments, the functionality of each of the database system 104 and the user-end device 106 may be incorporated into the electronic device 102, without a deviation from the scope of the disclosure.

Figure 2:
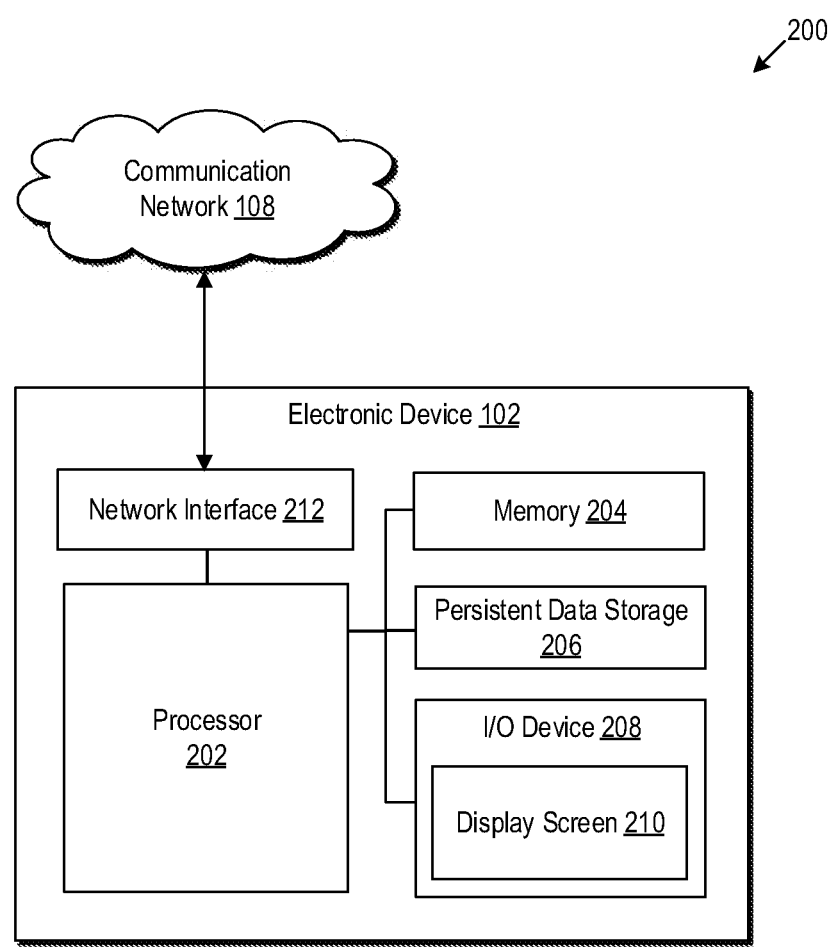
FIG. 2 is a block diagram that illustrates an exemplary electronic device for creation of the object-oriented software platform of FIG. 1.

FIG. 2 is a block diagram that illustrates an exemplary electronic device for creation of the object-oriented software platform of FIG. 1, arranged in accordance with at least one embodiment described in the present disclosure. FIG. 2 is explained in conjunction with elements from FIG. 1. With reference to FIG. 2, there is shown a block diagram 200 of the electronic device 102. The electronic device 102 may include a processor 202, a memory 204, a persistent data storage 206, an input/output (I/O) device 208, a display screen 210, and a network interface 212.

The processor 202 may include suitable logic, circuitry, and/or interfaces that may be configured to execute program instructions associated with different operations to be executed by the electronic device 102. For example, some of the operations to create the object-oriented software platform 114 may include performing a textual analysis of the documentation corpus 110, generation of a unified specification, generation of a set of API call objects, construction of a set of natural language descriptors for the set of API call objects, generation of a set of business objects, construction of a software package, and generation of an electronic UI to display user-selectable tools linked to the software package.

The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 202 may include any number of processors configured to, individually or collectively, perform or direct performance of any number of operations of the electronic device 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into the memory 204, the processor 202 may execute the program instructions. Some of the examples of the processor 202 may be a GPU, a CPU, a RISC processor, an ASIC processor, a CISC processor, a co-processor, and/or a combination thereof.

The memory 204 may include suitable logic, circuitry, interfaces, and/or code that may be configured to store program instructions executable by the processor 202. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or a special-purpose computer, such as the processor 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the electronic device 102.

The persistent data storage 206 may include suitable logic, circuitry, interfaces, and/or code that may be configured to store program instructions executable by the processor 202, operating systems, and/or application-specific information, such as logs and application-specific databases. The persistent data storage 206 may include computer-readable storage media for carrying or having computer-executable instructions or data structures stored thereon. Such computer-readable storage media may include any available media that may be accessed by a general-purpose or a special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the electronic device 102.

In some embodiments, the memory 204, the persistent data storage 206, or a combination thereof may store the documentation corpus 110 retrieved from the database system 104 and the unified specification generated from the documentation corpus 110.

The I/O device 208 may include suitable logic, circuitry, interfaces, and/or code that may be configured to receive a user input (for example, the user input associated with a user-selection of the set of selectable-tools linked to the software package). The I/O device 208 may be further configured to provide an output in response to the user input. The I/O device 208 may include various input and output devices, which may be configured to communicate with the processor 202 and other components, such as the network interface 212. Examples of the input devices may include, but are not limited to, a touch screen, a keyboard, a mouse, a joystick, and/or a microphone. Examples of the output devices may include, but are not limited to, a display and a speaker.

The display screen 210 may include suitable logic, circuitry, interfaces, and/or code that may be configured to render the generated electronic UI to the user 112. The display screen 210 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 212 may include suitable logic, circuitry, interfaces, and/or code that may be configured to establish a communication between the electronic device 102, the database system 104, and the user-end device 106, via the communication network 108. The network interface 212 may be implemented by use of various known technologies to support wired or wireless communication of the electronic device 102 via the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM™), Enhanced Data GSM Environment (ED GET™), wideband code division multiple access (W-CDMA), Long Term Evolution (LTE™), code division multiple access (CDMA), time division multiple access (TDMA), Bluetooth, Wireless Fidelity (Wi-Fi™) (such as IEEE 802.11a, IEEE 802.11b, IEEE 802.11g and/or IEEE 802.11n), voice over Internet Protocol (VoIP), light fidelity (Li-Fi), or Wi-MAX™. An example workflow for creation of the object-oriented software platform has been explained, for example, in FIG. 3.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
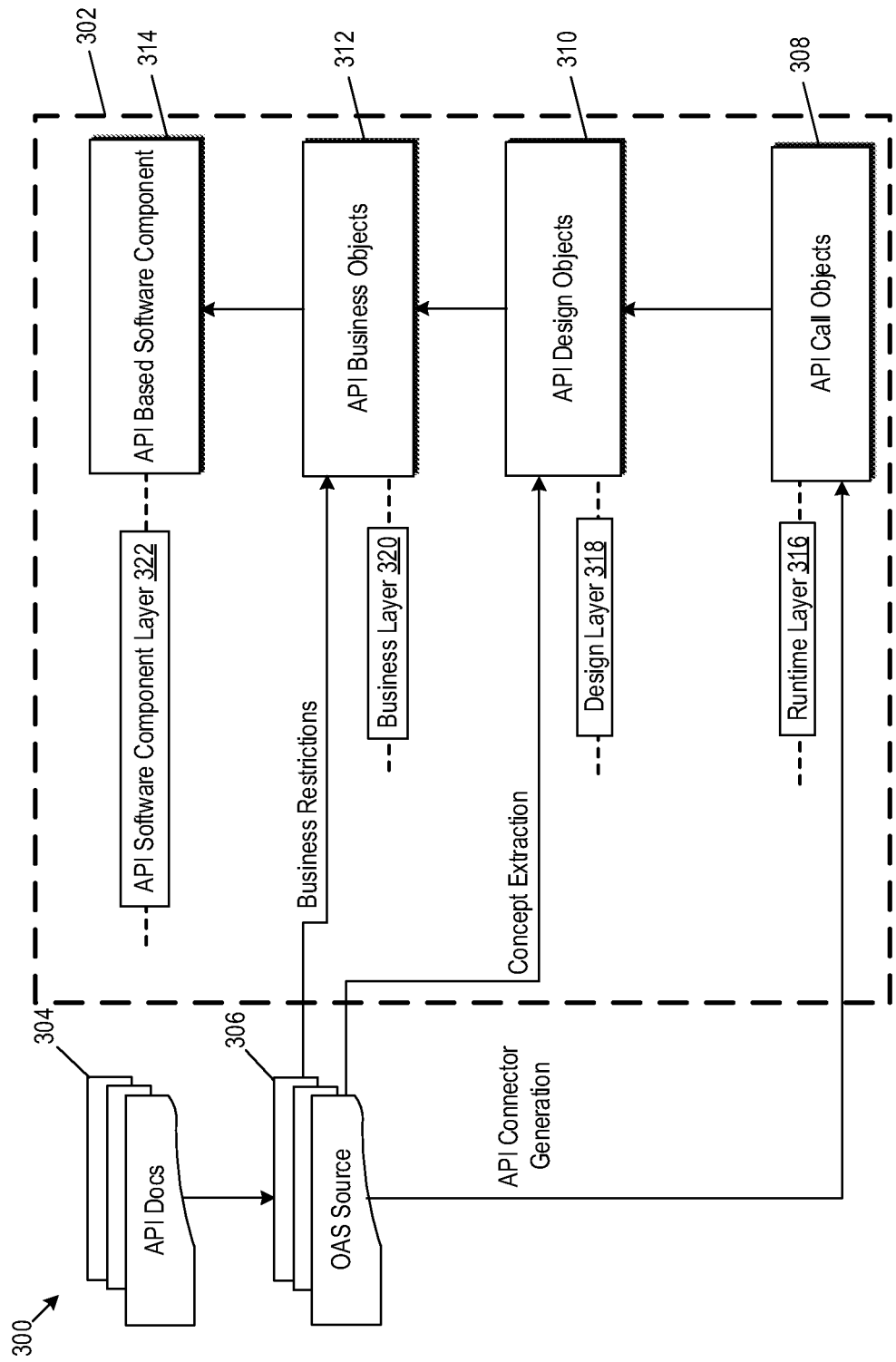
FIG. 3 illustrates an example workflow for creation of an object-oriented software platform.

FIG. 3 illustrates an example workflow for creation of an object-oriented software platform, arranged in accordance with at least one embodiment described in the present disclosure. FIG. 3 is explained in conjunction with elements from FIG. 1 and FIG. 2. With reference to FIG. 3, there is shown an example workflow 300 to create an object-oriented software platform 302 that allows users (such as the user 112) to develop software applications by interacting with the electronic UI of the object-oriented software platform 302. Herein, the object-oriented software platform 302 may be interchangeably referred to as a multi-level granularity software platform for developers. The example workflow 300 includes a set of API docs 304, an Open API Specification (OAS) Source 306, a set of API call objects 308, a set of API design objects 310, a set of API business objects 312, and an API-based software component 314.

The object-oriented software platform 302 may be associated with a layered software architecture. For example, the object-oriented software platform 302 may include a first layer (e.g., a runtime layer 316) that may encapsulate the set of API call objects 308 and a second layer (e.g., a design layer 318) that may encapsulate the set of API design objects 310 (i.e., the set of natural language descriptors corresponding to the set of API call objects 308). The object-oriented software platform 302 may further include a third layer (e.g., a business layer 320) that may encapsulate the set of API business objects 312 and a fourth layer (e.g., API software component layer 322) that may include the constructed software package (i.e., the API-based software component 314). By way of example, and not limitation, different artefacts may be included in each layer, as follows:

1. Runtime layer 316: Available resources, e.g., API connector(s), stand-alone API call object(s), and etc.
2. Design layer 318: micro web service(s), Processes, stand-alone functions, web services, concepts/natural language descriptors for API call object(s), and the like.
3. Business layer 320: Restrictions rules, limitation rules, context rules (e.g., Office APIs), and the like.
4. API software component layer 322: software component (e.g., software development kit (SDK), API, stand-alone software), web page interface, mobile app, and the like.

As shown, the first layer (i.e., the runtime layer 316) may form the lowest layer of the object-oriented software platform 302, followed by the second layer (i.e., the design layer 318), the third layer (i.e., the business layer 320), and the fourth layer (i.e., the API software component layer 322). The fourth layer may form the top-most layer of the object-oriented software platform 302 and may offer greatest abstraction among all the layers. Operations associated with the creation of the object-oriented software platform 302 are provided in detail, for example, in FIGS. 4, 5A, 5B, and 6.

Figure 4:
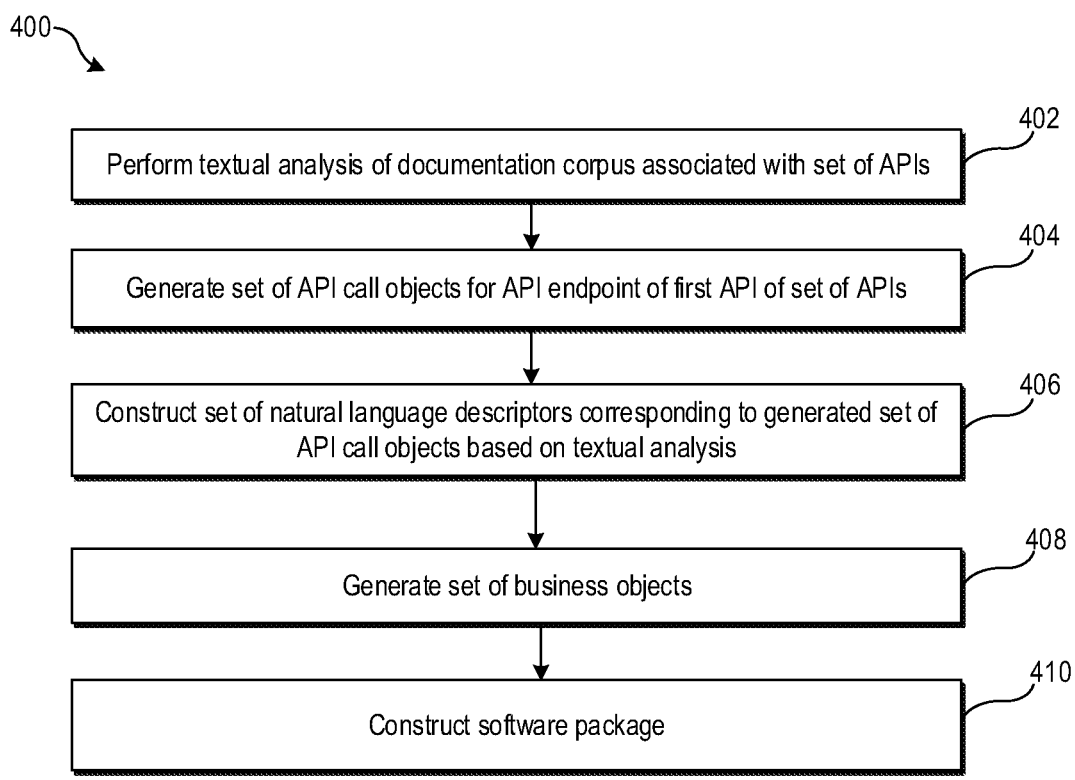
FIG. 4 is a flowchart of an example method for creation of the object-oriented software platform of FIG. 3.

FIG. 4 is a flowchart of an example method for creation of the object-oriented software platform of FIG. 3, arranged in accordance with at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example electronic device 102 of FIG. 2.

At 402, a textual analysis of the documentation corpus 110 associated with the set of APIs may be performed. In at least one embodiment, the processor 202 may perform the textual analysis of the documentation corpus 110. For example, as shown in FIG. 3, the set of API docs 304 may correspond to a documentation of the set of APIs (i.e., the documentation corpus 110) and may be available in a certain file format, such as, but not limited to, a Hyper Text Markup Language (HTML), a Portable Document Format (PDF™), a Unicode plain text (Txt), an Open XML document (DOCX), a Comma Separated Values (CSV), an Extensible Markup Language (XML), and a Rich Text document (RTF). The set of API docs 304 may include, for example, developer manuals, API specifications, API documentations, tutorials, code repositories (e.g., GitHub repositories), and the like. The processor 202 may apply one or more API learning methods (e.g., Natural language Processing (NLP) methods) to perform the textual analysis and generate the unified specification of the set of APIs. The unified specification may be included as the OAS source 306 in a certain format such as, but not limited to, a JavaScript Object Notation (JSON™) format, an Extensible Markup Language (XML) format, or a YAML format. The generation of the OAS source 306 from the set of API docs 304 is further explained, for example, in FIG. 5A. Such analysis may be, for example, based on natural language processing (NLP) methods which may rely on machine learning algorithms and trained neural network models to understand complex semantic structure of every API specification document and identify patterns that point to relevant information in the API specification document. By way of example, U.S. patent Ser. No. 15/374,798, which is incorporated by reference herein in its entirety, discusses one of the NLP methods to perform the textual analysis of individual API specification documents of the documentation corpus 110. Based on the textual analysis of the documentation corpus 110, the processor 202 may generate a unified specification associated with the set of APIs. The textual analysis of the documentation corpus 110 and generation of the unified specification is explained in detail, for example, in FIG. 5A.

At 404, a set of API call objects may be generated for an API endpoint of a first API of the set of APIs. In at least one embodiment, the processor 202 may generate the set of API call objects for the API endpoint of the first API. The generation of a first API call object of the set of API call objects in explained in detail, for example, in FIGS. 5A and 5B. Similarly, for other API endpoints, different sets of API call objects may be generated.

At 406, a set of natural language descriptors corresponding to the generated set of API call objects may be constructed based on the textual analysis. In at least one embodiment, the processor 202 may construct the set of natural language descriptors corresponding to the generated set of API call objects. The construction of a first natural language descriptor corresponding to the generated first API call object from the set of API call objects is explained, for example, in FIG. 6.

At 408, a set of business objects may be generated. In at least one embodiment, the processor 202 may generate the set of business objects. Each business object of the set of business objects may encapsulate conditions applicable on a set of input/output parameters associated with a corresponding API call object of the generated set of API call objects. In an embodiment, the conditions may include a set of restrictions on values of the set of input/output parameters, a configurable policy related to a use and access of the API endpoint, and a legacy as a restriction on a use of the set of input/output parameters. For example, the conditions may include minimum and maximum values of input/output parameters, a geography based usage restriction of the API endpoint (e.g., a policy that restricts the use of the API endpoint in a certain country/region), and certain values of the set of input/output parameters that correspond to legacy values (or deprecated values).

As discussed in FIG. 3, the set of natural language descriptors may correspond to the set of API design objects 310. In an embodiment, the processor 202 may combine all defined design objects from the set of Design Objects 308 as a process connector. For example, for a Scanner SDK, the Process Connector may include design objects associated with "New Scan" and "Email Scan" natural language descriptors (which may correspond to "new_scan( )" and "email_scan( )" call objects). Thereafter, the processor 202 may generate one or more business objects that may encapsulate restrictions and conditions associated with the aforementioned two design objects of the Scanner SDK.

As an example, the processor 202 may generate a business object to encapsulate a rule to define the maximum number of scans allowed for use of new_scan( ). As another example, the processor 202 may generate a business object to encapsulate a policy that may allow a specific group of users (such as, the user 112) to access the new_scan( ) function. As another example, the processor 202 may generate a business object to encapsulate a legacy that may restrict the allowable file storage paths associated with scanned files.

At 410, a software package may be constructed. The software package may encapsulate the generated set of API call objects, the constructed set of natural language descriptors as design objects, and the generated set of business objects. In at least one embodiment, the processor 202 may construct the software package that may encapsulate the generated set of API call objects, the constructed set of natural language descriptors, and the generated set of business objects. In an embodiment, the constructed software package may further encapsulate at least one of a software development kit (SDK), an API-based software component, a web-page interface, or a mobile application interface. It should be noted here that operations from 404 to 410 may be iteratively performed to construct software packages for other API endpoints and/or other APIs of the set of APIs.

In at least one embodiment, for the creation of the object-oriented software platform 302, the processor 202 may further generate an electronic UI. The generated electronic UI may include a set of UI elements as user-selectable tools linked to the constructed software package. The processor 202 may finally create the object-oriented software platform 302 in the form of computer-executable files and/or artefacts that include the electronic UI, the constructed software package(s), the set of business objects, the set of natural language descriptors, and the set of API call objects. The object-oriented software platform 302 may be associated with a layered software architecture (as also shown in FIG. 3) and may include the following:

1. First layer that encapsulates the generated set of API call objects
2. Second layer that encapsulates the set of natural language descriptors corresponding to the generated set of API call objects
3. Third layer that encapsulates the set of business objects
4. Fourth layer that includes the constructed software package An example method for development of a software application by use of the object-oriented software platform 302 is explained, for example, in FIG. 10. Although the flowchart 400 is illustrated as discrete operations, such as 402, 404, 406, 408, and 410, however, in certain embodiments, such discrete operations may be further divided into additional operations, combined into fewer operations, or eliminated, depending on the particular implementation without detracting from the essence of the disclosed embodiments.

Figure 5A:
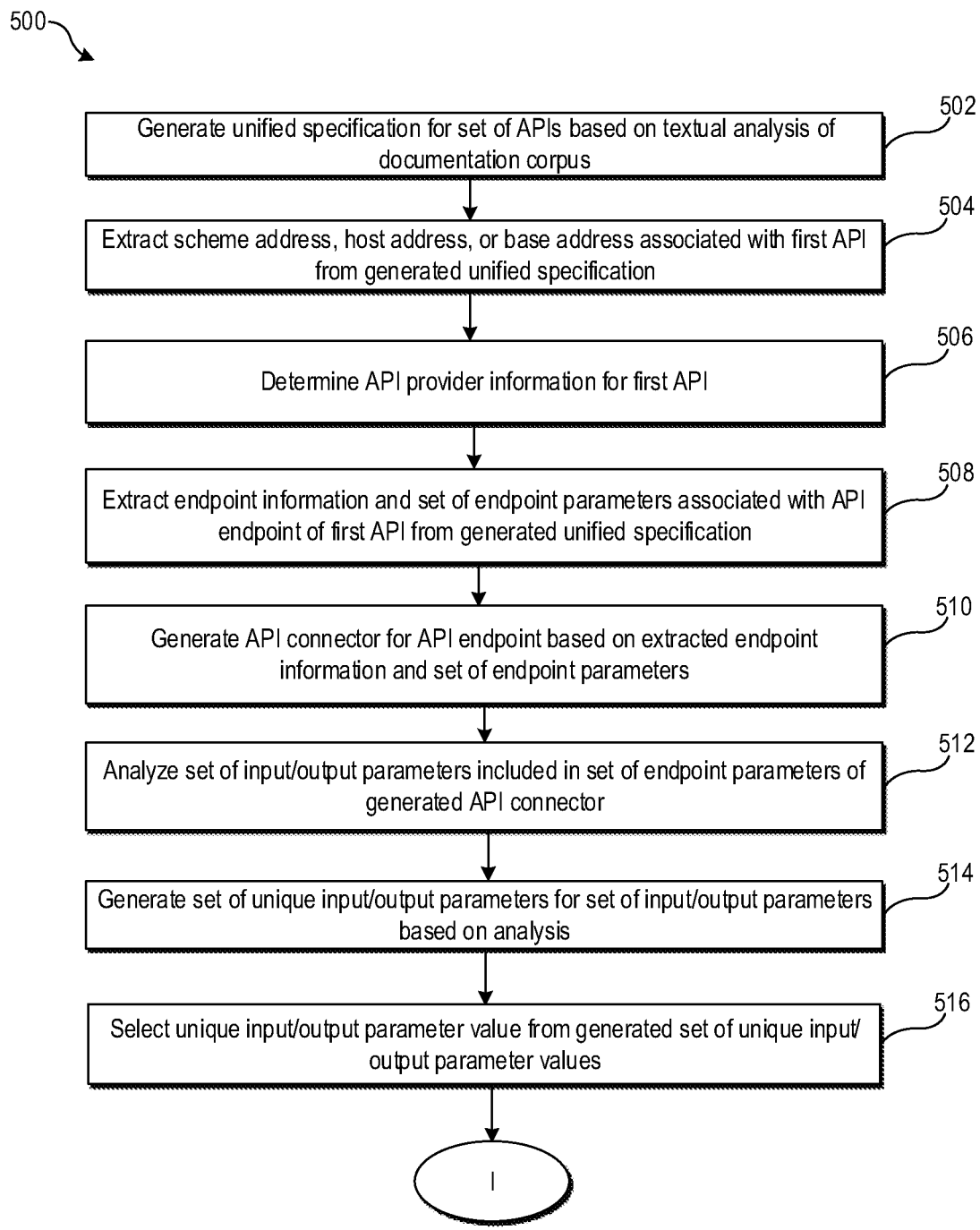
FIGS. 5A and 5B, collectively, illustrate a flowchart of an example method for generation of an API call object.
Figure 5B:
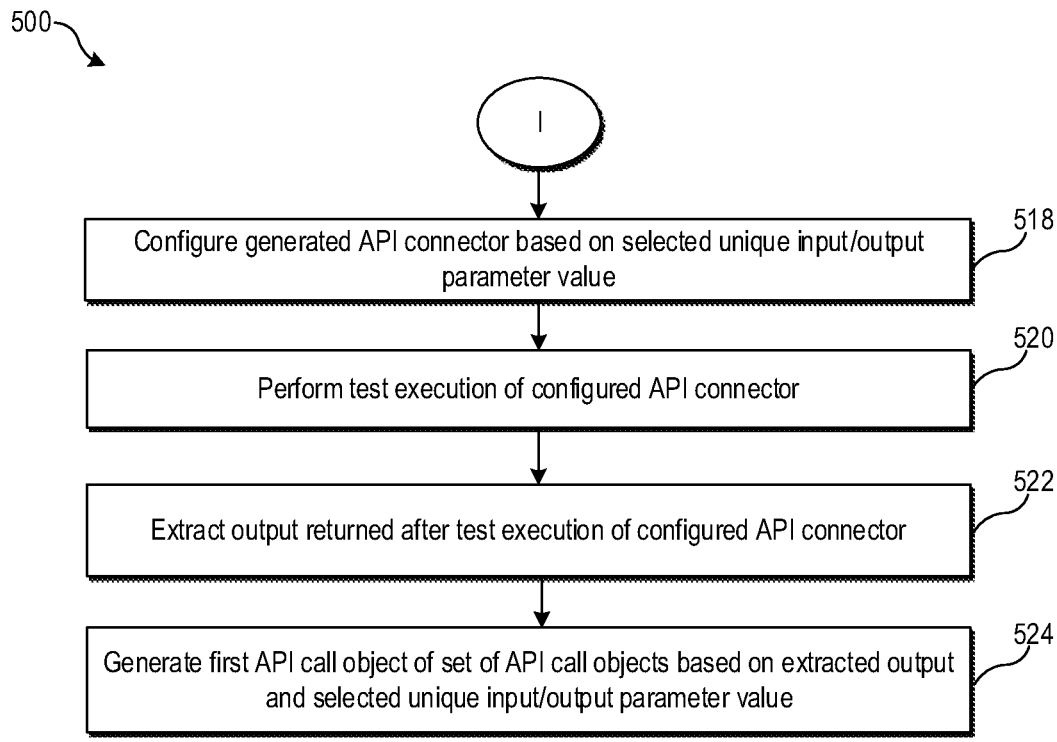

FIGS. 5A and 5B, collectively, illustrate a flowchart of an example method for generation of an API call object, arranged in accordance with at least one embodiment described in the present disclosure. FIGS. 5A and 5B are explained in conjunction with elements from FIG. 1, FIG. 2, FIG. 3, and FIG. 4. With reference to FIGS. 5A and 5B, there is shown a flowchart 500. The method illustrated in the flowchart 500 may start at 502 and may be performed by any suitable system, apparatus, or device, such as by the example electronic device 102 of FIG. 2. Although illustrated with discrete blocks, operations associated with one or more of the blocks of the flowchart 500 may be divided into additional blocks, combined into fewer blocks, or eliminated, depending on the particular implementation.

At 502, a unified specification for the set of APIs may be generated based on the textual analysis (for example, performed at 402 of FIG. 2) of the documentation corpus 110. An example of the unified specification may be an OAS specification, produced in a file format, such as an extensible markup language (XML) file or JavaScript Object Notation (JSON™) file. By way of example, and not limitation, from the textual analysis, different key objects from the documentation corpus may be extracted. Examples of the key objects may include, but are not limited to, API endpoints, schemes, base address, host address, endpoint parameters, parameter descriptions, parameter type, and input/output values for endpoint parameters.

For example, U.S. patent Ser. No. 15/851,599, which is incorporated by reference herein in its entirety, discusses a method to extract key objects from the documentation corpus 110 and to generate an API specification document for the set of APIs (also referred to as the unified specification).

For example, to generate the unified specification for the set of APIs, the processor 202 may learn heterogeneous APIs based on the documentation corpus 110 (e.g., the set of API docs 304) which may include functionalities, parameters, operations, accessibility and outputs of the set of APIs. The processor 202 may collate the documentation corpus 110 from different sources by crawling a network, such as, a web-based API resource network. The documentation corpus 110 may include natural language text that may describe an API resource of each API of the set of APIs.

The processor 202 may extract API information from the documentation corpus 110. The API information may include at least one function and at least one table that may include an attribute associated with the API resource. The processor 202 may then extract a description, that may include a subset of the natural language text, for each of the at least one function from the documentation corpus 110. Thereafter, the processor 202 may compare the extracted at least one table to a model of attributes to correlate extracted attributes with extracted functions. Further, the processor 202 may compile a machine-readable API specification as the unified specification (e.g., the OAS source 306) for the API resource described in the documentation corpus 110 based on the correlation between extracted attributes and the extracted functions and the subset of natural language text. An example of the unified specifications is shown, for example, in FIG. 7.

At 504, a scheme address, a host address, or a base address associated with the first API may be extracted from the generated unified specification. In at least one embodiment, the processor 202 may extract the scheme address, the host address, or the base address from the generated unified specification. The scheme address of an API may correspond to a communication protocol associated with establishment of a communication link with an endpoint, through an API connector associated with the API. The host address of the API may correspond to a uniform resource locator (URL) of a server which hosts a service of the API. Further, the base address of the API may correspond to a path associated with the API service hosted at the server. The host address, the scheme address, and the base address may be included as part of a payload associated with an API call message for the first API. In an example, the processor 202 may extract, from associated XML tags of the OAS source 306, the scheme address (such as, "https"), the host address (such as, "fujitsu.com"), and the base address (such as, "/scanner") for the first API (e.g., a Scanner API).

By way of example, and not limitation, if the URL included in the API provider information is "https://fujitsu.com/scanner", the endpoint parameter is "path" (i.e. represents the path of store scan images), and the endpoint information includes "/new_scan" as the URL for the API endpoint, then the processor 202 may generate the API connector for the API endpoint as: "https://fujitsu.com/scanner/new_scan?parameter=path"

In an embodiment, the processor 202 may also generate a program code for the API connector in a suitable programming language, such as, Python. An example of a Python code for a sample API connector related to "pretty print" API is given as follows:

```
Def API_Connector('alt': 'json', 'oauth_token': 'ya29.GluVBqfChgjhsdsjhkjsd
kjxhcjxhcsdsdA0A4kzzzBnIfOmekjJFFkjjFfkshfekSz4TVc701pxz6NOvDpMvcHfd
dvv_Layva', 'prettyPrint': 'True')
url=https://www.googleapis.com/plus/v1/people/{userId}/people/{collection
}
Para={values}
Return Request.get(url, para)
```

At 506, API provider information may be determined for the first API. In at least one embodiment, the processor 202 may determine the API provider information based on the extracted scheme address, the host address, or the base address associated with the first API. The API provider information may include a URL of the API provider associated with the first API. For example, if the extracted scheme address is "https", the host address is "fujitsu.com", and the base address is "/scanner" for the Scanner API, the API provider information may be determined based on concatenation of the scheme address, the host address, and the base address as "https://fujitsu.com/scanner" (i.e., the URL of the API provider of the first API).

At 508, endpoint information and a set of endpoint parameters associated with the API endpoint of the first API may be extracted from the generated unified specification. In at least one embodiments, the processor 202 may extract, from the generated unified specification, the endpoint information and the set of endpoint parameters associated with the API endpoint of the first API. For example, from the OAS specification, the endpoint information may include an address (a URL) associated with the API endpoint (e.g., a server address associated with the API endpoint). Similarly, the set of endpoint parameters may include input/output parameters (optional) which may have to be specified before an API call object (micro-service) for the API endpoint is generated. The extracted endpoint information and the extracted set of endpoint parameters may be used to create the payload to be included in the API call message for the API endpoint.

At 510, an API connector for the API endpoint may be generated based on the extracted endpoint information and the set of endpoint parameters. In some embodiments, the processor 202 may generate the API connector for the API endpoint based on the extracted endpoint information and the set of endpoint parameters. The generated API connector may include, for example, the set of endpoint parameters, the extracted endpoint information, and the URL included in the API provider information (determined at 506). The API connector may correspond to a program code that when executed forms a connection link between the API endpoint at the API provider end and an API client end (such as the electronic device 102).

In an embodiment, the processor 202 may generate the API connector for various target computing environments associated with the electronic device 102. For example, the API connector may be created to include a program code that is specific for a target computing environment, from where users may plan to issue API calls and deploy software applications that issue such API calls. For example, if the electronic device 102 corresponds to a cloud server, the target computing environment for the object-oriented software platform may be a cloud-based platform. The processor 202 may deploy API resources associated with the set of APIs to the target computing environment (e.g., the cloud-based platform) and add the corresponding generated API connectors and API endpoint information to the target computing environment (i.e., the cloud-based platform).

At 512, the set of input/output parameters included in the set of endpoint parameters of the generated API connector may be analyzed. In at least one embodiment, the processor 202 may analyze the set of input/output parameters included in the set of endpoint parameters of the generated API connector. For such analysis, a description of the input/output parameters in the unified specification may be analyzed to determine whether each parameter in the set of input/output parameters is a constant or a variable. Further, in case of a variable parameter, the processor 202 may determine which of the variable parameters have a finite number of variations or possible values for the variable parameters.

At 514, a set of unique input/output parameter values may be generated for the set of input/output parameters based on such analysis. In at least one embodiment, the processor 202 may generate the set of unique input/output parameter values for the set of input/output parameters. By way of example, and not limitation, to generate the set of unique input/output parameter values, the processors 202 may generate a constant value associated with each constant valued parameter. Also, the processor 202 may generate a set of variable values for each parameter with a finite number of possible variable parameter values. For example, the set of unique input/output parameter values for an API connector defined by "Test_API_Connector('alt','oauth_token','prettyPrint')" may be given by:

1. Parameter 'aft':'json' or 'xml' (two possible values)
2. Parameter 'oauth_token':user_input (infinite values possible)
3. Parameter 'prettyPrint':'True' or 'False' (two possible values)

At 516, a unique input/output parameter value may be selected from the generated set of unique input/output parameter values. In some embodiments, the processor 202 may select the unique input/output parameter value from the generated set of unique input/output parameter values. Such a selection may be, for example, based on a round-robin selection method. In the above example of the "Test_API_Connector", the value 'json' may be selected for the parameter 'aft' and the value 'True' may be selected for the parameter 'prettyPrint'. Value(s) for the parameter 'oauth_token' may not be selected as infinite values may be possible for the parameter.

At 518, the generated API connector may be configured based on the selected unique input/output parameter value. In at least one embodiment, the processor 202 may configure the generated API connector based on the unique input/output parameter value (e.g., selected at the block 516). Herein, the API connector may be utilized to produce several micro-service level API connectors (or several API call objects/scenarios) and the configured API connector may be merely one micro-service level API connector produced out of the generated API connector. In the above example of the "Test_API_Connector", based on the selected input/output parameter value for parameters 'aft' and 'prettyPrint', the API connector may be configured as: "Test_API_Connector('alt':'json', 'oauth_token':user_input,'prettyPrint':'True')". Other configurations of the API connector for other input/output parameter values may be given as follows:

Test_API_Connector('alt':'xml', 'oauth_token':user_input, 'prettyPrint':'True')
Test_API_Connector('alt':'xml', 'oauth_token':user_input, 'prettyPrint':'False')
Test_API_Connector('alt':'json', 'oauth_token':user_input, 'prettyPrint':'False')

At 520, a test execution of the configured API connector may be performed. In at least one embodiment, the processor 202 may perform the test execution of the configured API connector.

At 522, an output returned after the test execution of the configured API connector may be extracted. In at least one embodiment, the processor 202 may extract the output returned after the test execution of the configured API connector. Continuing with the above example of the "Test_API_Connector", the output may be extracted as a message in the 'json' format and styled according to the 'prettyPrint' style (as the 'prettyPrint' parameter was set to 'True'). Alternatively, the output may be extracted as a set of messages in the 'json' format and styled based on the 'prettyPrint' style. The set of messages may either include a single top message (represented by notation '[X]') or top 10 messages (represented by notation '[Y]').

At 524, a first API call object of the set of API call objects may be generated based on the extracted output and the selected unique input/output parameter value. In at least one embodiment, the processor 202 may generate the first API call object based on the extracted output and the selected unique input/output parameter value. In the above example of the "Test_API_Connector", if a single top message as the output is extracted in the 'json' format and styled in the 'prettyPrint' style, then the processor 202 may generate the first API call object as: "Test_API_Connector('alt':'json', 'oauth_token':user_input,'prettyPrint':'True')[X]"

By way of example, and not limitation, all possible combination of API call objects may be further generated with different finite variables' value (true/false, json/xml) and respective outputs ([X] and [Y]), as shown in Table 2.

TABLE 2

| Various API call objects (micro-service API call scenarios) | |
|---|---|
| Test_API_Connector('alt': 'json', 'oauth_token': user_input, 'prettyPrint': 'True') | Produces API connector with both X and Y |
| Test_API_Connector('alt': 'xml', 'oauth_token': user_input, 'prettyPrint': 'True') | |
| Test_API_Connector('alt': 'xml', 'oauth_token': user_input, 'prettyPrint': 'False') | |
| Test_API_Connector('alt': 'json', 'oauth_token': user_input, 'prettyPrint': 'False') | |
| Test_API_Connector('alt': 'json', 'oauth_token': user_input, 'prettyPrint': 'True')[X] | Produce API connector with Only X |
| Test_API_Connector('alt': 'xml', 'oauth_token': user_input, 'prettyPrint': 'True')[X] | |
| Test_API_Connector('alt': 'xml', 'oauth_token': user_input, 'prettyPrint': 'False')[X] | |
| Test_API_Connector('alt': 'json', 'oauth_token': user_input, 'prettyPrint': 'False')[X] | |
| Test_API_Connector('alt': 'json', 'oauth_token': user_input, 'prettyPrint': 'True')[Y] | Produce API connector with Only Y |
| Test_API_Connector('alt': 'xml', 'oauth_token': user_input, 'prettyPrint': 'True')[Y] | |
| Test_API_Connector('alt': 'xml', 'oauth_token': user_input, 'prettyPrint': 'False')[Y] | |
| Test_API_Connector('alt': 'json', 'oauth_token': user_input, 'prettyPrint': 'False')[Y] | |

Figure 6:
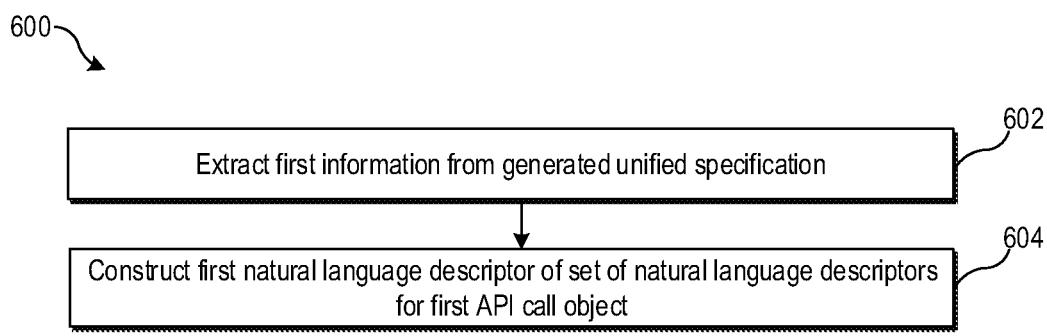
FIG. 6 is a flowchart of an example method for construction of a natural language descriptor.

For all API call objects (obtained at 524 and in table 2), a concept for each API call object may need to be defined, as described in FIG. 6, for example. For every API call object, the concept may need to be defined by a natural language descriptor.

Although the flowchart 500 is illustrated as discrete operations, such as 502, 504, 506, 508, 510, 512, 514, 516, 518, 520, 522, and 524, however, in certain embodiments, such discrete operations may be further divided into additional operations, combined into fewer operations, or eliminated, depending on the particular implementation without detracting from the essence of the disclosed embodiments.

FIG. 6 is a flowchart of an example method for construction of a natural language descriptor, arranged in accordance with at least one embodiment described in the present disclosure. FIG. 6 is explained in conjunction with elements from FIG. 1, FIG. 2, FIG. 3, FIG. 4, FIG. 5A and FIG. 5B. With reference to FIG. 6, there is shown a flowchart 600. The method illustrated in the flowchart 600 may start at 602 and may be performed by any suitable system, apparatus, or device, such as by the example electronic device 102 of FIG. 2.

At 602, first information may be extracted from the generated unified specification. In at least one embodiment, the processor 202 may extract the first information from the unified specification (e.g., the OAS source 306). The first information may include, for example, an API description, an API endpoint description, an API parameter description, and/or an API response description associated with the API endpoint of the first API.

At 604, a first natural language descriptor of the set of natural language descriptors for the first API call object (obtained at 524 of FIG. 5) may be constructed. In at least one embodiment, the processor 202 may construct the first natural language descriptor for the first API call object based on the selected unique input/output parameter value, the extracted output, and the extracted first information. The constructed first natural language descriptor may be indicative of a use of the first API call object and may include a natural language description and a topic associated with the first API call object.

In order to construct the natural language description, a sequence of NLP operations may be performed, as described herein. At first, a first description text may be determined for an input/output parameter value associated with the first API call object based on the extracted first information. Similarly, a second description text may be determined for the extracted output (e.g., extracted at 522 of FIG. 5). The processor 202 may determine an API title associated with the first API call object based on the extracted first information and thereafter, the processor 202 may semantically concatenate the determined first description text, the determined second description text, and the determined API title to construct the natural language description for the first API call object.

Continuing with the example of the "Test_API_Connector" (refer to FIG. 5B, block 524), the first call object may be generated as: "Test_API_Connector('alt':'json', 'oauth_token':user_input,'prettyPrint':'True') [X]" In the above example, the first description text may be determined for the parameter 'aft' as 'json format' and for the parameter 'prettyPrint' as 'with prettyPrint style'. For the extracted output (i.e., [X] or single top message), the second description text may be determined as 'Get top message'. Similarly, the API title may be determined as "Google+™ API". The first description text, the second description text, and the determined API title may be concatenated to obtain the natural language description for the first call object, given as:

"Get top message from Google+API as JSON format with prettyPrint style."

Continuing with the above example, the natural language description may serve as an indication of the use of the first API call object. The first natural language descriptor may also include a topic associated with the first API call object. For example, the topic may be determined based on a semantic equivalent of a primary verb and a primary subject associated with the natural language description. In the above example, the topic may be "Extract messages".

Although the flowchart 600 is illustrated as discrete operations, such as 602 and 604, however, in certain embodiments, such discrete operations may be further divided into additional operations, combined into fewer operations, or eliminated, depending on the particular implementation without detracting from the essence of the disclosed embodiments.

FIG. 7 is an example of a portion of a unified specification of a set of APIs, arranged in accordance with at least one embodiment described in the present disclosure. FIG. 7 is explained in conjunction with elements from FIG. 1, FIG. 2, FIG. 3, FIG. 4, FIG. 5A, FIG. 5B, and FIG. 6. With reference to FIG. 7, there is shown a portion of an Open API specification 700 for a set of RESTful APIs in JSON™ format.

The Open API specification 700 may include a portion of information related to the set of RESTful APIs and may be specified by one or more markup tags and/or categories. As shown in FIG. 7, the Open API specification 700 may include an info tag 702 that may include a title of each API of the set of RESTful APIs. The Open API specification 700 may further include a path tag 704 which may include information associated with the various API endpoints of the set of RESTful APIs. Such information may include URLs associated with the API endpoints.

The Open API specification 700 may further include a schemes tag 706 that may include information related to a communication protocol to be used for generation of API Connectors with the API endpoints. As an example, as shown, the scheme tag may indicate an "https" (Hyper Text Transfer Protocol Secure) communication protocol for the set of RESTful APIs. Furthermore, the Open API specification 700 may include a parameters tag 708 that may include information related to various parameters associated with the API endpoints. As an example, FIG. 7 shows two 'query' type parameters, such as, a first parameter 710A named 'prettyPrint' and a second parameter 710B named 'fields'. The first parameter 710A may be of a 'Boolean' type with a default value of 'True'. According to a description of the first parameter 710A, the parameter "Returns response with indentations and line breaks". Similarly, the second parameter 710B may be of a 'String' type with a description "Selector specifying which fields to include in a partial response."

It should be noted that the portion of the Open API specification 700 shown in FIG. 7 is presented merely as an example and should not be construed as limiting the present disclosure. The present disclosure may include other information related to APIs or the Open API specification 700 may be in other formats, such as an XML or YAML format, without a deviation from the scope of the present disclosure.

Figure 8:
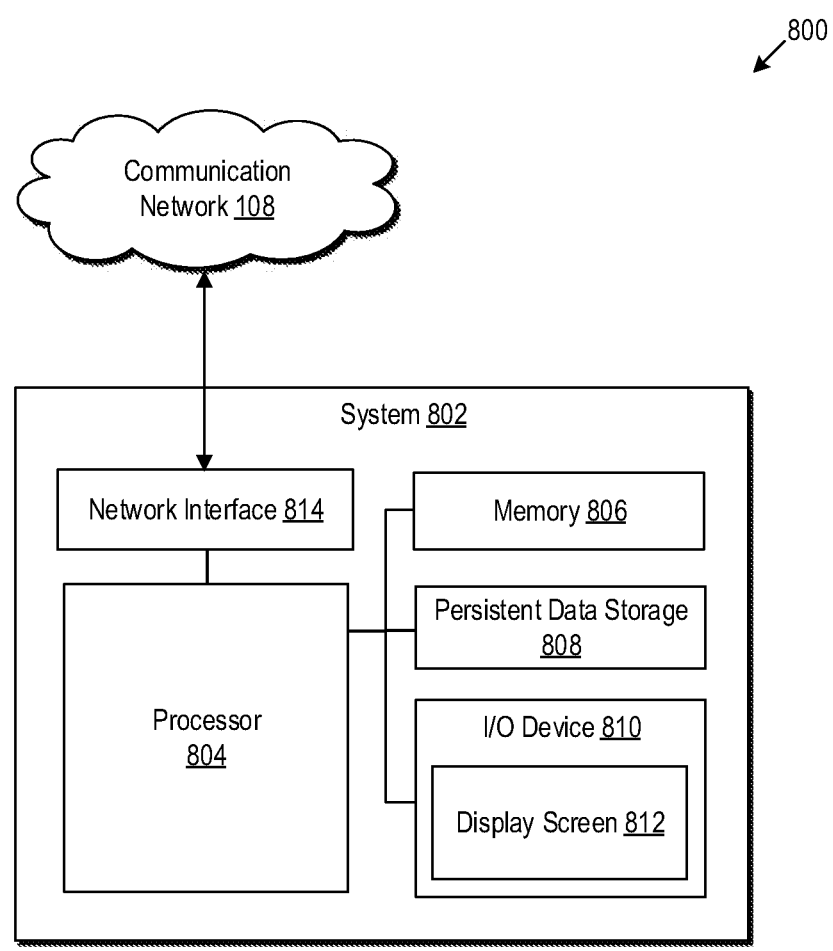
FIG. 8 is a block diagram that illustrates an exemplary system for deployment of an object-oriented software platform.

FIG. 8 is a block diagram that illustrates an exemplary system for deployment of an object-oriented software platform, arranged in accordance with at least one embodiment described in the present disclosure. FIG. 8 is explained in conjunction with elements from FIG. 1, FIG. 2, FIG. 3, FIG. 4, FIG. 5A, FIG. 5B, FIG. 6, and FIG. 7. With reference to FIG. 8, there is shown a block diagram 800 of a system 802. The system 802 may include a processor 804, a memory 806, a persistent data storage 808, an input/output (I/O) device 810, a display screen 812, and a network interface 814.

The processor 804 may include suitable logic, circuitry, and/or interfaces that may be configured to execute program instructions associated with different operations to be executed by the system 802. For example, some of the operations may be related to deployment and live execution of an object-oriented software platform (such as the object-oriented software platform 114/302). The processor 804 may include any suitable special-purpose or general-purpose computer, computing entity, or processing device including various computer hardware or software modules and may be configured to execute instructions stored on any applicable computer-readable storage media. For example, the processor 804 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 804 may include any number of processors configured to, individually or collectively, perform or direct performance of any number of operations of the system 802, as described in the present disclosure. Additionally, one or more of the processors may be present on one or more different electronic devices, such as different servers. In some embodiments, the processor 804 may be configured to interpret and/or execute program instructions and/or process data stored in the memory 806 and/or the persistent data storage 808. In some embodiments, the processor 804 may fetch program instructions from the persistent data storage 808 and load the program instructions in the memory 806. After the program instructions are loaded into the memory 806, the processor 804 may execute the program instructions. Some of the examples of the processor 804 may be a GPU, a CPU, a RISC processor, an ASIC processor, a CISC processor, a co-processor, and/or a combination thereof.

The memory 806 may include suitable logic, circuitry, interfaces, and/or code that may be configured to store program instructions executable by the processor 804. In certain embodiments, the memory 806 may be configured to store operating systems and associated application-specific information. The memory 806 may include computer-readable storage media for carrying or having computer-executable instructions or data structures stored thereon. Such computer-readable storage media may include any available media that may be accessed by a general-purpose or a special-purpose computer, such as the processor 804. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 804 to perform a certain operation or group of operations associated with the system 802.

The persistent data storage 808 may include suitable logic, circuitry, interfaces, and/or code that may be configured to store program instructions executable by the processor 804, operating systems, and/or application-specific information, such as logs and application-specific databases. The persistent data storage 808 may include computer-readable storage media for carrying or having computer-executable instructions or data structures stored thereon. Such computer-readable storage media may include any available media that may be accessed by a general-purpose or a special-purpose computer, such as the processor 804.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 804 to perform a certain operation or group of operations associated with the system 802.

The I/O device 810 may include suitable logic, circuitry, interfaces, and/or code that may be configured to receive a user input (for example, the user input associated with a user-selection of the set of selectable-tools linked to the software package). The I/O device 810 may be further configured to provide an output in response to the user input. The I/O device 810 may include various input and output devices, which may be configured to communicate with the processor 804 and other components, such as the network interface 814. Examples of the input devices may include, but are not limited to, a touch screen, a keyboard, a mouse, a joystick, and/or a microphone. Examples of the output devices may include, but are not limited to, a display and a speaker.

The display screen 812 may include suitable logic, circuitry, interfaces, and/or code that may be configured to render the generated electronic UI to the user 112. The display screen 812 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 814 may include suitable logic, circuitry, interfaces, and/or code that may be configured to establish a communication between the system 802, the electronic device 102, and the user-end device 106. The network interface 814 may be implemented by use of various known technologies to support wired or wireless communication of the system 802. The network interface 814 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 814 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the system 802 without departing from the scope of the present disclosure. For example, in some embodiments, the system 802 may include any number of other components that may not be explicitly illustrated or described for the sake of brevity.

Figure 9:
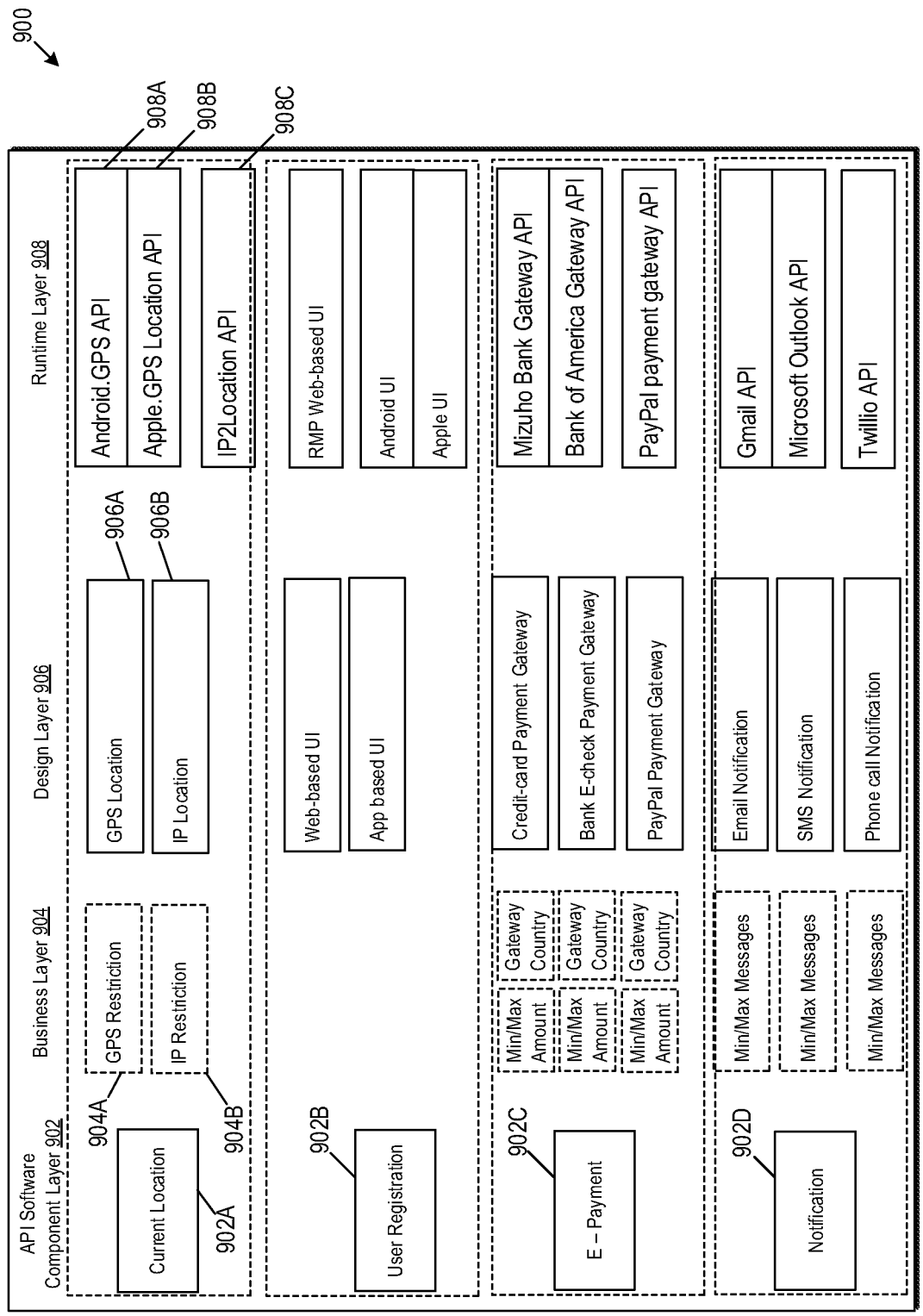
FIG. 9 illustrates an example of different objects at different layers of the object-oriented software platform of FIG. 1.

FIG. 9 illustrates an example of different objects at different layers of the object-oriented software platform of FIG. 1, arranged in accordance with at least one embodiment described in the present disclosure. FIG. 9 is explained in conjunction with elements from FIG. 1, FIG. 2, FIG. 3, FIG. 4, FIG. 5A, FIG. 5B, FIG. 6, FIG. 7, and FIG. 8. With reference to FIG. 9, there is shown an example 900 of different objects at different layers of the object-oriented software platform 114. In the example 900, there is shown an API software component layer 902, a business layer 904, a design layer 906, and a runtime layer 908.

Once the object-oriented software platform 114 is created, then a user may simply pick objects that appear in each of the API software component layer 902, the business layer 904, the design layer 906, and the runtime layer 908.

However, by selecting an object from a higher-layer, limited option of available resources/concepts may appear in lower layers. For example, a user may select notification in the business layer 904, then in the design layer 906, only available resources (e.g., email notification, phone call notification and text message-SMS notification) may be available for user selection.

The API software component layer 902 may encapsulate user-selectable objects which correspond to the constructed software package (e.g., obtained at 410) for an application-area. As shown, these user-selectable objects may include a current location object 902A, a user registration object 902B, an e-payment object 902C, and a notification object 902D. Each of the user-selectable objects may be linked to a respective software package.

For each user-selectable object (or the constructed software package), the business layer 904 may include user-selectable options related to the conditions applicable on the set of input/output parameters of API call objects included in the respective software package. As shown, for the current location object 902A, the business layer 904 may include GPS restrictions option 904A and IP restrictions option 904B to specify conditions applicable on set of input/output parameters of API call objects included in the constructed software package for the current location object 902A.

For each user-selectable object (or constructed software package), the design layer 906 may encapsulate the set of natural language descriptors (obtained in FIG. 6) as concepts. These concepts may describe multiple microservices or API call objects related to the application area of the constructed software package. As shown, the design layer 906 encapsulates a design object that includes a GPS location 906A and an IP location 906B as two topics included in the natural language descriptor for the current location object 902A.

For each concept or topic (included in a natural language descriptor) in the design layer 906, the runtime layer 908 may include the set of API call objects (e.g., generated at 524). As shown, the runtime layer 908 may include options related to API call objects, such as an Android.GPS API 908A, an Apple.GPS API 908B, and an IP2Location API 908C. Here, the Android.GPS API 908A and the Apple.GPS API 908B may be related to the GPS location 906A in the design layer 906 and the IP2Location API 908C may be related to the IP Location 906B in the design layer 906.

Figure 10:
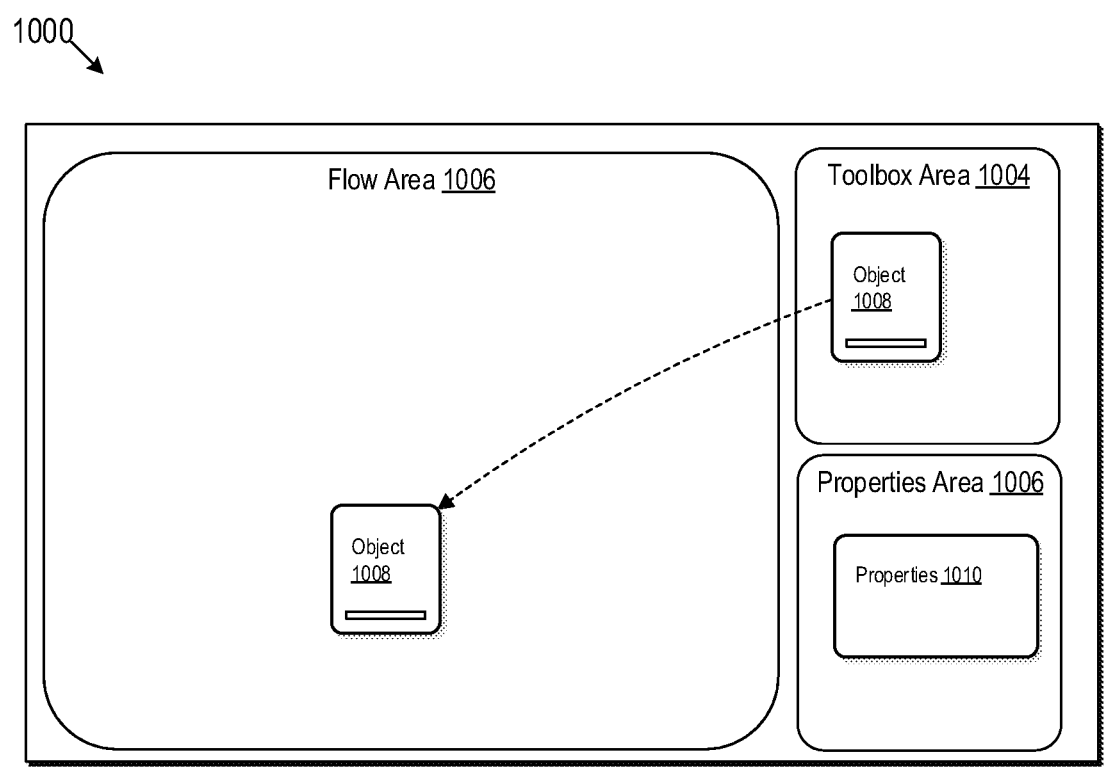
FIG. 10 is an example electronic UI of the object-oriented software platform of FIG. 1.

FIG. 10 is an example electronic UI of the object-oriented software platform of FIG. 1, arranged in accordance with at least one embodiment described in the present disclosure. FIG. 10 is explained in conjunction with elements from FIG. 1, FIG. 2, FIG. 3, FIG. 4, FIG. 5A, FIG. 5B, FIG. 6, FIG. 7, FIG. 8, and FIG. 9. With reference to FIG. 10, there is shown an electronic UI 1000. For creation of the object-oriented software platform 114, the processor 804 may generate an electronic UI 1000 which may include a set of UI elements, such as, a flow area 1002, a toolbox area 1004, and a properties area 1006. Once created, the object-oriented software platform 114 may be deployed on a suitable computing device, such as, on the system 802 or the electronic device 102.

For instance, at the system 802, the processor 804 may render the electronic UI 1000 on the display screen 210 so as to allow a user (such as the user 112) to develop a software application using the object-oriented software platform 114. The processor 804 may display objects associated with every layer of the object-oriented software platform 114 in the toolbox area 1004. The user 112 may simply have to drag an object 1008 from the toolbox area 1004 and add it to the flow area 1002. Once the user-selection is made for the object 1008 in the toolbox area 1004, the processor 804 may display properties 1010 of the selected object 1008 in the properties area 1006 so as to allow the user 112 to set the properties 1010 of the selected object 1008. Additionally, objects/options that belong a lower layer of the selected object 1008 may appear in the toolbox area 1004 or the flow area 1002. The above process may be iterated till the lowest layer is reached and the resultant source code for a software component is ready to be compiled to generate the software application for the user 112. An example of a method for the development of the software application using the electronic UI 1000 of the object-oriented software platform 114 is explained, for example, in FIGS. 12A and 12B. Though not elaborated herein, the set of UI elements may include other user-selectable objects and set of user-selectable options in the hierarchy associated with the various software layers of the object-oriented software platform 114, without departure from the scope of the disclosure.

Figure 11:
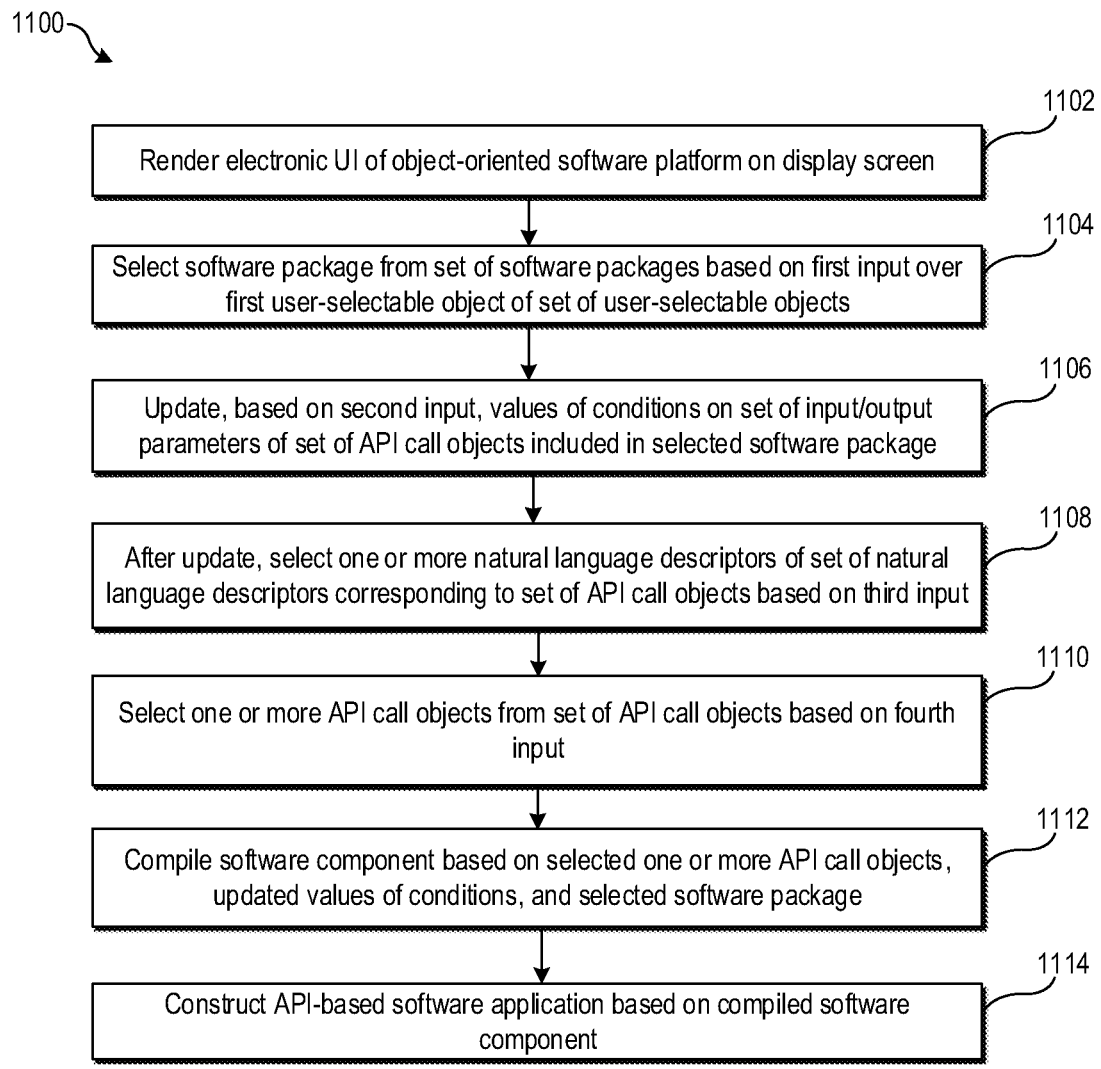
FIG. 11 illustrates a flowchart of an example method for development of a software application using the object-oriented software platform of FIG. 3.

FIG. 11 illustrates a flowchart of an example method for development of a software application using the object-oriented software platform of FIG. 3, arranged in accordance with at least one embodiment described in the present disclosure. FIG. 11 is explained in conjunction with elements from FIGS. 1, 2, 3, 4, 5A, 5B, 6, 7, 8, 9, and 10. With reference to FIG. 11, there is shown a flowchart 1100. The method illustrated in the flowchart 1100 may start at 1102 and may be performed by any suitable system, apparatus, or device, such as by the system 802 of FIG. 8 or the electronic device 102 of FIG. 2. Although illustrated with discrete blocks, operations associated with one or more of the blocks of the flowchart 1100 may be divided into additional blocks, combined into fewer blocks, or eliminated, depending on the particular implementation.

At 1102, an electronic UI of the object-oriented software platform 302 may be rendered on the display screen 812 of the system 802. In at least one embodiment, the processor 804 may be configured to render the electronic UI (e.g., the electronic UI 1000) on the display screen 812. The object-oriented software platform 302 may be associated with a layered software architecture and may include, for example, a first layer, a second layer, a third layer, and a fourth layer. The first layer may encapsulate the set of API call objects 308, while the second layer may encapsulate the set of natural language descriptors (i.e., a set of API design objects 310) corresponding to the set of API call objects 308. Further, the third layer may encapsulate the set of API business objects 312. Each business object may include conditions on the set of input/output parameters. The fourth layer may include the set of software packages (e.g., the API-based software component 314), where each software package may encapsulate the set of API call objects 308, the set of API design objects 310, and the set of API business objects 312.

The rendered electronic UI may include a set of user-selectable objects that may correspond to a set of software packages. Here, each software package may be associated with an application area and may add a specific functionality to the software application that the user 112 plans to develop. As an example, as shown in FIG. 9, the current location object 902A, the user registration object 902B, the e-payment object 902C, and the notification object 902D may be displayed on the electronic UI as a set of user-selectable objects.

At 1104, a software package may be selected from the set of software packages based on a first input (e.g., a user input) over a first user-selectable object of the set of user-selectable objects. In at least one embodiment, the processor 804 may select the software package from the set of software packages. As an example, the first input may be provided by the user 112 over the current location object 902A to select the software package related to location. In an embodiment, the selected software package may encapsulate the set of API call objects 308, the set of natural language descriptors (i.e., the set of API design objects 310) corresponding to the set of API call objects, and the conditions on the set of input/output parameters (corresponding to the set of API business objects 312).

At 1106, values may be updated for the conditions on the set of input/output parameters of the set of API call objects 308 included in the selected software package. Such an update may be based on a second input (e.g., another user input). In at least one embodiment, the processor 804 may update the values for conditions on the set of input/output parameters of the set of API call objects 308 included in the selected software package. Such an update may be performed based on the second input from the user 112.

Continuing with the above example, based on a user input, the processor 804 may select and update GPS restrictions via the GPS restrictions option 904A. For instance, the GPS restrictions option 904A may include limitations related to a GPS device, a selected geographical region for use of the GPS device, a restriction of user access to the GPS device, and a time limitation to use the GPS device. Other types of restrictions, such as financial restrictions, user authentication, and/or user authorization, on the set of API design objects 310 may be updated via other business objects in the business layer 320.

At 1108, after the update, one or more natural language descriptors may be selected based on a third input (e.g., another user input). In at least one embodiment, the processor 804 may be configured to select the one or more natural language descriptors from the set of natural language descriptors. The set of natural language descriptors may appear as concepts in the design layer 318 to define the set of API call objects 308. Continuing with the above example, after the selection and configuration of the GPS restriction options 904A based on the user input, the GPS location 906A in the design layer 318 may be selected by the user 112 as a natural language descriptor/concept of API call object(s) over which the conditions (at 1106) may be applicable.

At 1110, one or more API call objects may be selected from the set of API call objects 308 based on a fourth input (e.g., another user input). In at least one embodiment, the processor 804 may select the one or more API call objects from the set of API call objects 308. Continuing with the above example, after the selection of GPS location 906A based on the user input, an API call object related to an Android® OS, such as Android.GPS API 908A may be selected, in case the target software application is for the Android® platform.

At 1112, a software component may be compiled based on the selected one or more API call objects, the updated values of the conditions, and the selected software package. In at least one embodiment, the processor 804 may compile the software component based on the selected one or more API call objects, the updated values of the conditions, and the selected software package. The compilation may turn source files, including the selected one or more API call objects, the updated values of the conditions, and the selected software package, into computer-executable software artifact(s) or intermediate objects. These computer-executable software artifact(s) or intermediate objects, as a part of the compiled software component, may constitute a software application.

At 1114, an API-based software application may be constructed based on the compiled software component. In at least one embodiment, the processor 804 may be configured to construct the API-based software application based on the compiled software component. Continuing with the above example, a Current Location software component may be compiled and integrated with a target API-based software application. Software compilation and software packaging are typically known to one skilled in the art, and therefore, a detailed description for the same is omitted from the disclosure for the sake of brevity.

Although the flowchart 1100 is illustrated as discrete operations, such as 1102, 1104, 1106, 1108, 1110, 1112, and 1114, however, in certain embodiments, such discrete operations may be further divided into additional operations, combined into fewer operations, or eliminated, depending on the particular implementation without detracting from the essence of the disclosed embodiments.

Figure 12A:
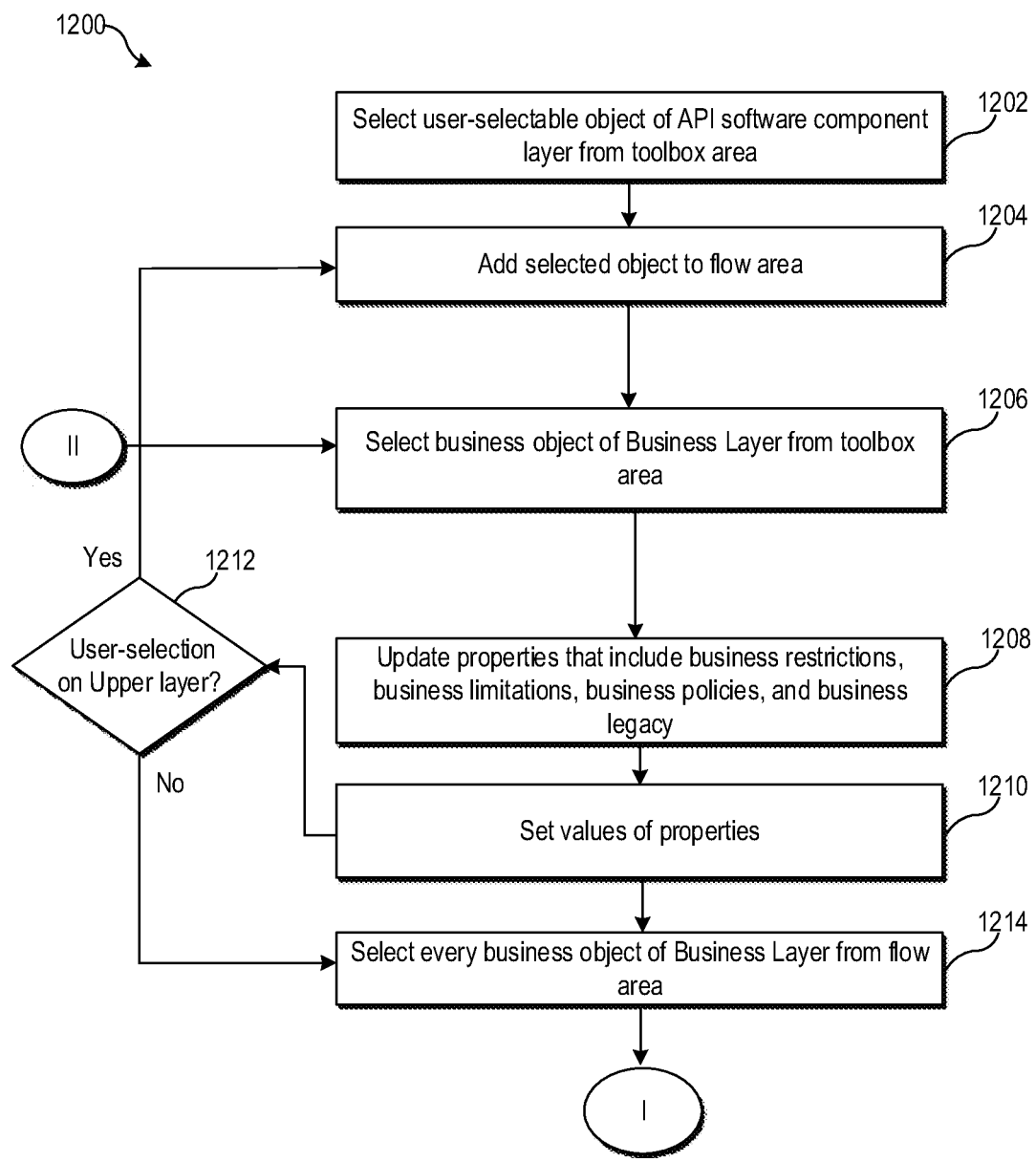
FIGS. 12A and 12B, collectively, illustrate a flowchart of an example method for the development of a software application using the object-oriented software platform of FIG. 3, all according to at least one embodiment described in the present disclosure.
Figure 12B:
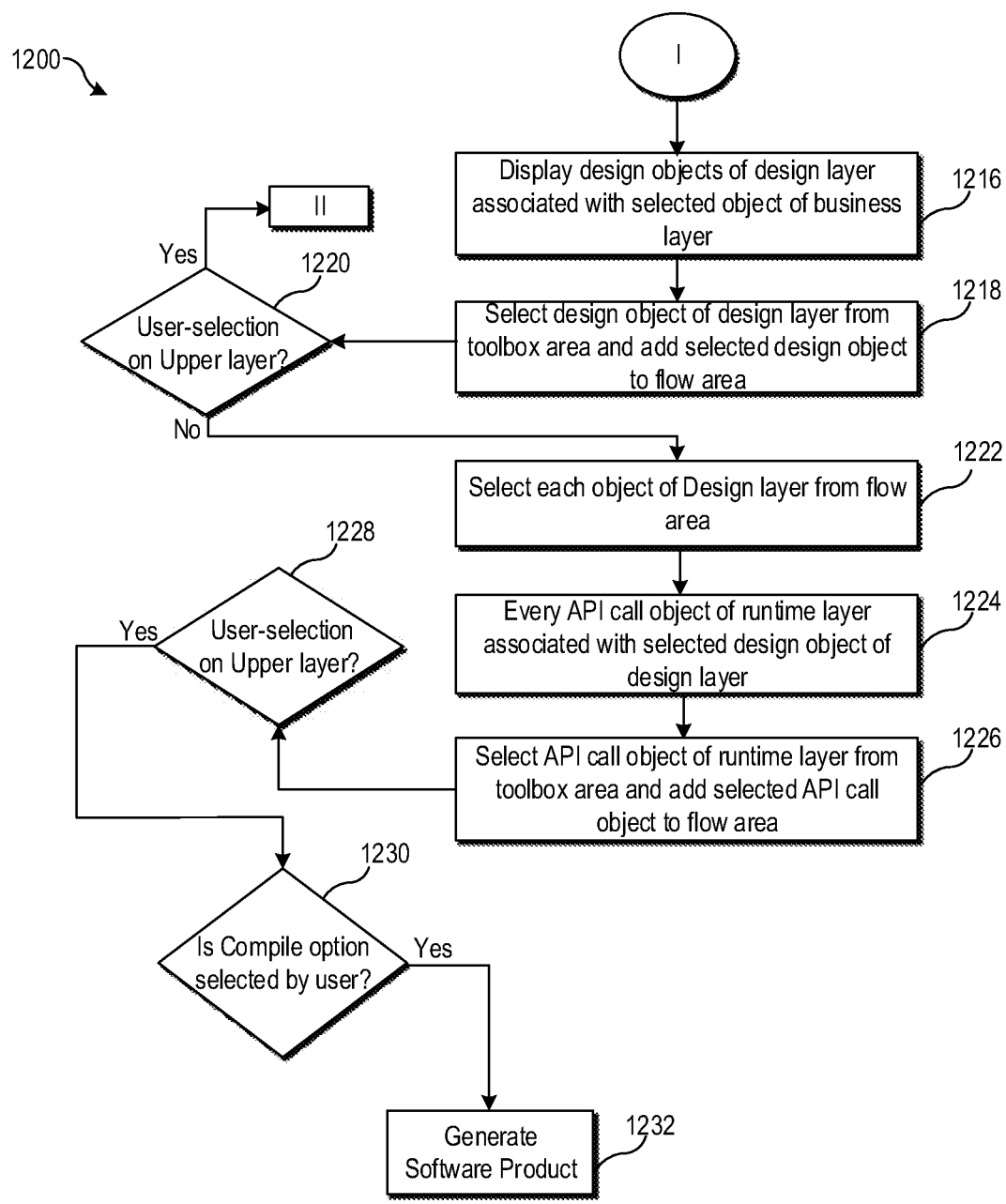

FIGS. 12A and 12B, collectively, illustrate a flowchart of an example method for the development of a software application using the object-oriented software platform of FIG. 3, arranged in accordance with at least one embodiment described in the present disclosure. FIGS. 12A and 12B are explained in conjunction with elements from FIGS. 1, 2, 3, 4, 5A, 5B, 6, 7, 8, 9, 10, and 11. With reference to FIGS. 12A and 12B, there is shown a flowchart 1200. The method illustrated in the flowchart 1200 may start at 1202 and may be performed by any suitable system, apparatus, or device, such as by the system 802 of FIG. 8. Although illustrated with discrete blocks, operations associated with one or more of the blocks of the flowchart 1200 may be divided into additional blocks, combined into fewer blocks, or eliminated, depending on the particular implementation.

At 1202, a user-selectable object of the API software component layer 322 may be selected from the toolbox area 1004. In an embodiment, the processor 804 may select the user-selectable object of the API software component layer 322. Various user-selectable objects of the API software component layer 322 may be initially present in the toolbox area 1004 for user-selection. Based on a user input (such as, a mouse-click or a touch input via the display screen 812), the processor 804 may select a user-selectable object of the API software component layer 322 from the toolbox area 1004.

At 1204, the user-selectable object may be added to the flow area 1002. In an embodiment, the processor 804 may add the selected user-selectable object of the API software component layer 322 to the flow area 1002, based on a user input (such as, a mouse-click or a touch input, a drag and drop input). Once added to the flow area 1002, business objects from next layer, i.e., the business layer 320 may appear with the user-selectable object.

At 1206, a business object of the business layer 320 may be selected from the flow area 1002. In an embodiment, the processor 804 may select the business object of the business layer 320, based on a user input (such as, a mouse-click or a touch input via the display screen 812). Based on the selection of the business object, the processor 804 may populate the toolbox area 1004/properties area 1006 with options/properties related to the selected business object in the business layer 320.

At 1208, properties that may include business restrictions, business limitations, business policies, and business legacy may be updated based on a user input. In an embodiment, based on the user input, the processor 804 may update the properties. Including but not limited to, business restrictions, business limitations, business policies, and business legacy. These properties may appear in the properties area 1006.

At 1210, values of the properties may be set. In an embodiment, the processor 804 may set the values of the properties associated with the selected business object of the business layer 320.

At 1212, a check may be performed to determine whether the user 112 has selected an upper layer (e.g., the API software component layer 322) associated with the object-oriented software platform 302. In an embodiment, the processor 804 may perform the check. In case the processor 804 determines that an upper layer (or upper layer object) is selected, control may pass to 1204. Otherwise, control may pass to 1214.

At 1214, every business object in the business layer 320 may be selected from the flow area 1002. In an embodiment, the processor 804 may select every object in the business layer 320 based on a user input (such as, mouse double-clicks or touch inputs via the display screen 812). For every selection, the processor 804 may populate the toolbox area 1004 with design objects of the design layer 318.

At 1216, the design objects of the design layer 318 may be displayed for the selected business object. In an embodiment, the processor 804 may display, in the toolbox area 1004, each design object associated with the selected business object of the business layer 320 and the selected user-selectable object of the API software component layer 322.

At 1218, a design object of the design layer 318 may be selected from toolbox area 1004 and may be added to the flow area 1002. In an embodiment, the processor 804 may select the design object of the design layer 318 from the toolbox area 1004 based on a user input (such as, a mouse-click or a touch input via the display screen 812).

At 1220, a check may be performed to determine whether the user 112 has selected an upper layer associated with the object-oriented software platform 302. In an embodiment, the processor 804 may perform the check. In case the processor 804 determines that a user-input is received for the upper layer (or an upper layer object), control may pass to 1206. Otherwise, control may pass to 1222.

At 1222, each design object of the design layer 318 in the flow area 1002 may be selected. In an embodiment, the processor 804 may select each object of the design layer 318 based on a user input (such as mouse double-clicks or touch inputs via the display screen 812). For every selection, the toolbox area 1004 may be populated with respective API call objects of the runtime layer 316.

At 1224, every API call object of the runtime layer 316 associated with the selected design object of the design layer 318 may be displayed. In an embodiment, the processor 804 may display every API call object of the runtime layer 316 associated with the selected design object of the design layer 318, in the toolbox area 1004.

At block 1226, an API call object of the runtime layer 316 may be selected from toolbox area 1004 and may be added to the flow area 1002. In an embodiment, the processor 804 may select the API call object of the runtime layer 316 from the toolbox area 1004 based on a user input (such as, a mouse-click or a touch input via the display screen 812).

At 1228, a check may be performed to determine whether the user 112 has selected an upper layer associated with the object-oriented software platform 302. In an embodiment, the processor 804 may perform the check. In case the processor 804 determines that a user-input is not for an upper layer (or upper layer object), control may pass to 1230.

At 1230, a check may be performed to determine if the user 112 has selected an option to compile the software component. In an embodiment, the processor 804 may perform the check. In case the processor 804 determines that the user 112 has selected the option to compile the software component, the processor 804 may perform operations associated with block 1232.

At 1232, a software product may be generated. In an embodiment, the processor 804 may generate the software product based on the compilation of the software component using the user-selected objects of the runtime layer 316, the user-selected objects of the design layer 318, the user-configured properties associated with objects of the business layer 320, and the user-selected objects of the API software component layer 322. The processor 804 may compile the software component by use of a software compiling technique and may generate the software product based on the compiled software component. Control may further pass to end.

Although the flowchart 1200 is illustrated as discrete operations, such as 1202, 1204, 1206, 1208, 1210, 1212, 1214, 1216, 1218, 1220, 1222, 1224, 1226, 1228, 1230, and 1232, however, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as the example electronic device 102) to perform operations. The operations may include creating an object-oriented software platform. The operation of creation of the object-oriented software may further include performing a textual analysis of a documentation corpus associated with a set of APIs. The operations may further include generating a set of API call objects for an API endpoint of a first API of the set of APIs. The operations may further include constructing a set of natural language descriptors corresponding to the generated set of API call objects based on the textual analysis. Further, the operations may include generating a set of business objects. Each business object of the set of business objects may encapsulate conditions applicable on a set of input/output parameters associated with a corresponding API call object of the generated set of API call objects. The operations may further include constructing a software package that may encapsulate the generated set of API call objects, the constructed set of natural language descriptors, and the generated set of business objects.

Another embodiment of the disclosure may provide one or more non-transitory computer-readable storage media configured to store instructions that, in response to being executed, cause a system (such as the system 802) to perform operations. The operations may include rendering of an electronic UI of an object-oriented software platform on a display device. The rendered electronic UI may comprise a set of user-selectable objects that may correspond to a set of software packages. Further, the operations may include selecting a software package from the set of software packages based on a first input over a first user-selectable object of the set of user-selectable objects. The operations may further include updating, based on a second input, values of conditions on a set of input/output parameters for a set of API call objects included in the selected software package. The operations may further include selecting, after the update, at least one natural language descriptor of a set of natural language descriptors corresponding to the set of API call objects based on a third input. The operations may further include selecting at least one API call object of the set of API call objects based on a fourth input. Further, the operations may include compiling a software component based on the selected at least one API call object, the updated values of the conditions, and the selected software package. The operations may include constructing an API-based software application based on the compiled software component.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   creating an object-oriented software platform, the creating comprising:
   performing a textual analysis of a documentation corpus associated with a set of application programming interfaces (APIs);
   generate a set of application programming interface (API) call objects for an API endpoint of a first API of the set of APIs;
   constructing a set of natural language descriptors corresponding to the generated set of API call objects based on the textual analysis;
   generating a set of business objects,
      wherein each business object of the set of business objects encapsulates conditions applicable on a set of input/output parameters associated with a corresponding API call object of the generated set of API call objects;
   constructing a software package that encapsulates the generated set of API call objects, the constructed set of natural language descriptors, and the generated set of business objects;
   generating a unified specification for the set of APIs based on the textual analysis of the documentation corpus;
   extracting, from the generated unified specification, a scheme address, a host address, or a base address associated with the first API;
   determining API provider information for the first API based on the extracting the scheme address, the host address, or the base address associated with the first API; and
   generating an API connector for the API endpoint, based at least on the determined API provider information, so as to provide a communication link between the API endpoint at the API provider end and an API client end.

2. The method according to claim 1, wherein the creating further comprises:
   extracting, from the generated unified specification, endpoint information and a set of endpoint parameters associated with the API endpoint of the first API; and
   the generating an API connector for the API endpoint includes generating the API connector for the API endpoint based further on the extracted endpoint information and the extracted set of endpoint parameters,
      wherein the generated API connector comprises the set of endpoint parameters, the endpoint information, and a uniform resource locator (URL) included in the determined API provider information.

3. The method according to claim 2, wherein the creating further comprises:
analyzing the set of input/output parameters included in the set of endpoint parameters of the generated API connector; and
generating a set of unique input/output parameter values for the set of input/output parameters based on the analysis.

4. The method according to claim 3, wherein the creating further comprises:
selecting a unique input/output parameter value from the generated set of unique input/output parameters values;
configuring the generated API connector based on the selected unique input/output parameter value;
performing a test execution of the configured API connector; and
extracting an output returned after the test execution of the configured API connector.

5. The method according to claim 4, wherein the creating further comprises generating a first API call object of the set of API call objects based on the extracted output and the selected unique input/output parameter value.

6. The method according to claim 5, wherein the creating further comprises:
extracting, from the generated unified specification, first information comprising an API description, an API endpoint description, an API parameter description, or an API response description associated with the API endpoint of the first API; and
constructing a first natural language descriptor of the set of natural language descriptors for the first API call object based on the selected unique input/output parameter value, the extracted output, and the extracted first information.

7. The method according to claim 6, wherein the constructed first natural language descriptor is indicative of a use of the first API call object and comprises a natural language description and a topic associated with the first API call object.

8. The method according to claim 7, wherein the constructing the first natural language descriptor comprises:
determining a first description text for an input/output parameter associated with the first API call object based on the extracted first information;
determining a second description text for the extracted output;
determining an API title associated with the first API call object based on the extracted first information; and
semantically concatenating the determined first description text, the determined second description text, and the determined API title to construct the natural language description associated with the first API call object.

9. The method according to claim 1, wherein the conditions comprise a set of restrictions on values of the set of input/output parameters, a configurable policy related to a use and access of the API endpoint, and a legacy as a restriction on a use of the set of input/output parameters.

10. The method according to claim 1, wherein the constructed software package further encapsulates at least one of a software development kit (SDK), an API-based software component, a web-page interface, or a mobile application interface.

11. The method according to claim 1, wherein the creating further comprises generating an electronic user interface (UI) comprising a set of UI elements as user-selectable tools linked to the constructed software package.

12. The method according to claim 11, wherein the set of UI elements comprises:
a first UI element comprising a user-selectable object corresponding to the constructed software package for an application-area;
a second UI element comprising first user-selectable options related to the conditions applicable on the set of input/output parameters;
a third UI element comprising second user-selectable options related to the constructed set of natural language descriptors; and
a fourth UI element comprising third user-selectable options related to the generated set of API call objects.

13. The method according to claim 1, wherein the created object-oriented software platform is associated with a layered software architecture, and
wherein the created object-oriented software platform comprises:
a first layer that encapsulates the generated set of API call objects,
a second layer that encapsulates the set of natural language descriptors corresponding to the generated set of API call objects,
a third layer that encapsulates the set of business objects, and
a fourth layer that includes the constructed software package.

14. A non-transitory computer-readable medium having encoded therein programming code executable by one or more processors to perform or control performance of operations comprising:
creating an object-oriented software platform, the creating comprising:
performing a textual analysis of a documentation corpus associated with a set of application programming interfaces (APIs);
generate a set of application programming interface (API) call objects for an API endpoint of a first API of the set of APIs;
constructing a set of natural language descriptors corresponding to the generated set of API call objects based on the textual analysis;
generating a set of business objects,
wherein each business object of the set of business objects encapsulates conditions applicable on a set of input/output parameters associated with a corresponding API call object of the generated set of API call objects;
constructing a software package that encapsulates the generated set of API call objects, the constructed set of natural language descriptors, and the generated set of business objects;
generating a unified specification for the set of APIs based on the textual analysis of the documentation corpus;
extracting, from the generated unified specification, a scheme address, a host address, or a base address associated with the first API; and
determining API provider information for the first API based on the extracting the scheme address, the host address, or the base address associated with the first API; and
generating an API connector for the API endpoint, based at least on the determined API provider information, so as to provide a communication link between the API endpoint at the API provider end and an API client end.

15. The non-transitory computer-readable medium according to claim 14, wherein the creating further comprises generating an electronic user interface (UI) comprising a set of UI elements as user-selectable tools linked to the constructed software package.

16. A system, comprising:
circuitry configured to:
- render an electronic user interface (UI) of an object-oriented software platform on a display device, wherein the rendered electronic UI comprises a set of user-selectable objects that correspond to a set of software packages included in the object-oriented software platform;
- select a software package from the set of software packages based on a first input over a first user-selectable object of the set of user-selectable objects,
- update, based on a second input, values of conditions on a set of input/output parameters for a set of Application Programming interface (API) call objects included in the selected software package;
- after the update, select at least one natural language descriptor of a set of natural language descriptors corresponding to the set of API call objects based on a third input;
- select at least one API call object of the set of API call objects based on a fourth user input;
- compile a software component based on the selected at least one API call object, the updated values of the conditions, and the selected software package; and
- construct an API-based software application based on the compiled software component;

wherein the object-oriented software platform is associated with a layered software architecture and comprises:
- a first layer that encapsulates the set of API call objects,
- a second layer that encapsulates the set of natural language descriptors corresponding to the set of API call objects,
- a third layer that encapsulates a set of business objects, wherein each business object includes conditions on the set of input/output parameters, and
- a fourth layer that includes the set of software packages.

17. The system according to claim 16, wherein the selected software package encapsulates the set of API call objects, the set of natural language descriptors corresponding to the set of API call objects, and the conditions on the set of input/output parameters.

* * * * *